US012365066B2

(12) United States Patent
Hale et al.

(10) Patent No.: US 12,365,066 B2
(45) Date of Patent: Jul. 22, 2025

(54) FASTENER INSTALLATION SYSTEMS AND ADAPTERS

(71) Applicant: SIMPSON STRONG-TIE COMPANY INC., Pleasanton, CA (US)

(72) Inventors: Troy Hale, Goodlettsville, TN (US); Adam Tillinghast, Nashville, TN (US)

(73) Assignee: SIMPSON STRONG-TIE COMPANY INC., Pleasanton, CA (US)

(*) Notice: Subject to any disclaimer, the term of this patent is extended or adjusted under 35 U.S.C. 154(b) by 170 days.

(21) Appl. No.: 17/450,672

(22) Filed: Oct. 12, 2021

(65) Prior Publication Data

US 2022/0111500 A1 Apr. 14, 2022

Related U.S. Application Data

(60) Provisional application No. 63/091,701, filed on Oct. 14, 2020.

(51) Int. Cl.
*B25B 23/04* (2006.01)
*B25B 21/00* (2006.01)

(52) U.S. Cl.
CPC ............ *B25B 23/045* (2013.01); *B25B 21/00* (2013.01)

(58) Field of Classification Search
CPC ....... B25B 23/045; B25B 23/04; B25B 21/00; B25F 5/02; B25F 1/04; B25F 3/00
See application file for complete search history.

(56) References Cited

U.S. PATENT DOCUMENTS

| | | | |
|---|---|---|---|
| 197,609 | A | 11/1877 | Copeland |
| 1,024,151 | A | 4/1912 | Smith |
| 1,436,161 | A | 11/1922 | Foedisch et al. |
| 1,793,053 | A | 2/1931 | Cahill et al. |
| 1,815,559 | A | 7/1931 | Garrigus |
| 1,815,594 | A | 7/1931 | Shaw et al. |
| 2,009,580 | A | 7/1935 | Govanus |
| 2,621,685 | A | 12/1952 | Butz |
| 2,631,619 | A | 3/1953 | Folli |
| 2,696,940 | A | 12/1954 | Andresen |
| 2,901,749 | A | 9/1959 | Crossen et al. |
| 2,901,912 | A | 9/1959 | Digby |
| 2,982,595 | A | 5/1961 | Rogers |
| 3,167,778 | A | 2/1965 | Decot et al. |

(Continued)

FOREIGN PATENT DOCUMENTS

| | | | |
|---|---|---|---|
| CA | 1040600 | A | 10/1978 |
| CA | 1054982 | A | 5/1979 |

(Continued)

OTHER PUBLICATIONS

U.S. Appl. No. 29/754,812, filed Oct. 14, 2020, Troy Hale.

(Continued)

*Primary Examiner* — David B. Thomas
(74) *Attorney, Agent, or Firm* — Fishman Stewart PLLC; Cecily Anne O'Regan; Jeong Hee Seo

(57) ABSTRACT

Fastener installation systems, devices and methods for driving fasteners, including fasteners, into a surface are disclosed. The fastener installation systems include an adapter operable to engage a chuck on a power tool on a first end and a fastener delivery attachment on an opposing end.

11 Claims, 23 Drawing Sheets

(56) References Cited

U.S. PATENT DOCUMENTS 3,305,156 A 2/1967 Khan
3,353,737 A 11/1967 Howard et al.
3,550,831 A 12/1970 Obergfell
3,554,246 A 1/1971 Halstead
3,587,842 A 6/1971 Keck et al.
3,592,339 A 7/1971 Briggs
3,601,168 A 8/1971 Gustaf
3,623,646 A 11/1971 Adolf et al.
3,826,419 A 7/1974 Maestri
3,830,364 A 8/1974 Hedlund
3,885,669 A 5/1975 Potucek
3,891,014 A 6/1975 Gunn
3,910,324 A 10/1975 Nasiatka
3,920,169 A 11/1975 Decaro
3,920,324 A 11/1975 Otto
3,930,297 A 1/1976 Potucek et al.
3,960,191 A 6/1976 Murray
3,967,727 A 7/1976 Jakesch
4,014,225 A 3/1977 Lejdegard et al.
4,018,254 A 4/1977 DeCaro
4,019,631 A 4/1977 Lejdegard et al.
4,040,325 A 8/1977 Monacelli
4,062,388 A 12/1977 Decaro
4,146,071 A 3/1979 Mueller et al.
4,167,229 A 9/1979 Keusch et al.
4,302,991 A 12/1981 Bernard et al.
4,367,837 A 1/1983 Manino
4,383,608 A 5/1983 Potucek
4,404,877 A 9/1983 Mizuno et al.
4,428,261 A 1/1984 Takatsu et al.
4,478,112 A 10/1984 Moulton
4,510,826 A 4/1985 Marks
4,566,619 A 1/1986 Kleinholz
4,581,964 A 4/1986 Takatsuru
4,607,761 A 8/1986 Wright et al.
4,625,597 A 12/1986 Cast
4,684,022 A 8/1987 Potucek
4,809,568 A 3/1989 Decaro
4,930,630 A 6/1990 Habermehl
4,930,635 A 6/1990 Hotchkiss et al.
4,949,463 A 8/1990 Chen
4,972,589 A 11/1990 Povleski
4,998,452 A 3/1991 Blum
5,027,679 A 7/1991 Kawashima et al.
5,031,489 A 7/1991 Young et al.
5,083,483 A 1/1992 Takagi
5,144,870 A 9/1992 Nick
5,167,174 A 12/1992 Fujiyama et al.
5,168,085 A 12/1992 Addiego et al.
5,186,085 A 2/1993 Monacelli
5,193,729 A 3/1993 Dewey et al.
5,231,900 A 8/1993 Deri
5,284,074 A 2/1994 Chen
5,303,620 A 4/1994 Payne et al.
5,337,635 A 8/1994 Habermehl
5,339,713 A 8/1994 Hou
5,341,706 A 8/1994 Takagi
5,351,586 A 10/1994 Habermehl et al.
5,402,659 A 4/1995 Turner et al.
5,402,695 A 4/1995 Hornung
5,409,111 A 4/1995 Takumi
5,443,345 A 8/1995 Gupta
5,452,630 A 9/1995 Haas et al.
5,469,767 A 11/1995 Lyle
5,473,965 A 12/1995 Chen
5,517,883 A 5/1996 Goeldi et al.
5,531,142 A 7/1996 Adamo
5,531,143 A 7/1996 Habermehl et al.
5,542,323 A 8/1996 Habermehl et al.
5,544,746 A 8/1996 Dohi
5,568,753 A 10/1996 Habermehl et al.
5,570,618 A 11/1996 Habermehl et al.
5,622,024 A 4/1997 Habermehl
5,662,011 A 9/1997 Habermehl
5,671,642 A 9/1997 Haas
5,699,704 A 12/1997 Habermehl
5,758,768 A 6/1998 Habermehl et al.
5,819,609 A 10/1998 Habermehl
5,826,468 A 10/1998 Daubinger et al.
5,839,332 A * 11/1998 Fujiyama .............. B25B 23/045 81/57.37
5,855,151 A 1/1999 Habermehl
5,870,933 A 2/1999 Habermehl et al.
5,927,163 A 7/1999 Habermehl et al.
5,934,162 A 8/1999 Habermehl
5,943,926 A 8/1999 Habermehl
D414,093 S 9/1999 Zurwelle
6,055,891 A 5/2000 Habermehl
6,073,521 A 6/2000 Uno et al.
6,089,132 A 7/2000 Lyle
6,109,144 A 8/2000 Muro
6,109,145 A 8/2000 Habermehl
6,123,244 A 9/2000 Huang
6,164,170 A 12/2000 Habermehl et al.
6,212,980 B1 4/2001 Kratch et al.
6,227,429 B1 5/2001 Huang
6,244,140 B1 6/2001 Habermehl
6,425,306 B1 7/2002 Habermehl
6,453,780 B2 9/2002 Lyle
D468,173 S 1/2003 Morgan
D469,344 S 1/2003 Habermehl et al.
6,601,480 B1 8/2003 Habermehl
6,622,596 B2 9/2003 Janusz et al.
6,647,836 B1 11/2003 Habermehl
6,655,573 B1 * 12/2003 Chang ................... B25B 23/045 227/138
6,701,811 B1 * 3/2004 Chang ................... B25B 23/045 81/434
6,729,522 B2 5/2004 Hempfling et al.
D492,561 S 7/2004 Chen
D492,562 S 7/2004 Chen
6,769,332 B2 * 8/2004 Muro .................... B25B 23/045 81/57.37
D498,398 S 11/2004 Chen
D499,000 S 11/2004 Chen
6,862,963 B2 3/2005 Habermehl et al.
6,915,724 B2 * 7/2005 Kigel ..................... B21J 15/323 81/433
6,941,847 B2 9/2005 Habermehl et al.
6,959,630 B2 11/2005 Habermehl
7,134,367 B2 11/2006 Gehring et al.
7,341,146 B2 3/2008 Habermehl
7,475,740 B2 * 1/2009 Kozina ..................... B25F 3/00 173/164
7,950,312 B2 * 5/2011 Matthiesen ........... B25B 23/045 81/57.37
D639,629 S 6/2011 Torigai et al.
8,233,909 B2 7/2012 Harada et al.
8,235,270 B2 8/2012 Gosis et al.
8,240,232 B2 * 8/2012 Hale ....................... B25B 23/00 81/57.37
8,515,271 B2 8/2013 Tanaka
8,544,369 B2 * 10/2013 Park ...................... B25B 23/045 81/57.37
D692,741 S 11/2013 McRoberts et al.
D694,605 S 12/2013 Reth et al.
D712,224 S 9/2014 Zhang
D712,225 S 9/2014 Larson
D743,229 S 11/2015 Koeniger et al.
D764,248 S 8/2016 Eisinger et al.
9,452,514 B2 * 9/2016 Guthrie ................... B25F 5/029
D774,868 S 12/2016 Ouyang
D775,448 S 12/2016 Fretz
9,701,032 B2 7/2017 Voss et al.
9,724,750 B2 8/2017 Gostylla
D823,089 S 7/2018 Shikama
10,018,215 B2 * 7/2018 Walters ................... F16B 35/04
D849,494 S 5/2019 Feuerstein
D850,229 S 6/2019 Goodman
10,406,659 B2 * 9/2019 Dicaire ................. B25B 21/002
D879,574 S 3/2020 Liu
D887,239 S 6/2020 Nyström et al.
10,675,741 B2 6/2020 Chiang

(56) References Cited

U.S. PATENT DOCUMENTS

| | | | | |
|---|---|---|---|---|
| D924,031 | S | 7/2021 | Huang | |
| D935,295 | S | 11/2021 | Bacon et al. | |
| D939,304 | S | 12/2021 | Lindoro et al. | |
| 11,247,325 | B2 * | 2/2022 | Jeremenko | B25B 21/00 |
| 11,618,136 | B2 * | 4/2023 | Dash | B25B 21/007 173/46 |
| 11,759,936 | B2 * | 9/2023 | Magda | F16H 1/20 81/57.29 |
| 2002/0108995 | A1 | 8/2002 | Hempfling | |
| 2003/0110908 | A1 | 6/2003 | Habermehl | |
| 2004/0074344 | A1 | 4/2004 | Carroll | |
| 2004/0128818 | A1 | 7/2004 | Motsenbocker | |
| 2004/0139822 | A1 | 7/2004 | Gehring et al. | |
| 2007/0079672 | A1 | 4/2007 | Bone et al. | |
| 2007/0102178 | A1 | 5/2007 | Kozina | |
| 2009/0194954 | A1 | 8/2009 | Hsu | |
| 2009/0206122 | A1 | 8/2009 | King | |
| 2010/0059541 | A1 * | 3/2010 | Hsu | B25B 23/04 221/232 |
| 2010/0163595 | A1 | 7/2010 | Draht | |
| 2011/0011609 | A1 * | 1/2011 | Simm | B25F 5/026 173/171 |
| 2011/0120739 | A1 | 5/2011 | Chen | |
| 2012/0073410 | A1 | 3/2012 | Hoffman | |
| 2014/0260831 | A1 | 9/2014 | Hays et al. | |
| 2014/0304973 | A1 * | 10/2014 | Guthrie | B25F 3/00 29/525.11 |
| 2016/0000449 | A1 | 1/2016 | Aman et al. | |
| 2016/0221164 | A1 * | 8/2016 | Walters | B25B 21/00 |
| 2016/0271781 | A1 * | 9/2016 | Kobayashi | F16H 25/20 |
| 2016/0375563 | A1 * | 12/2016 | Junkers | B25F 5/026 81/467 |
| 2017/0157756 | A1 | 6/2017 | Hale et al. | |
| 2017/0241464 | A1 | 8/2017 | Vandenberg | |
| 2017/0320197 | A1 * | 11/2017 | Dicaire | B25F 5/029 |
| 2018/0126541 | A1 * | 5/2018 | Jeremenko | B25H 1/0035 |
| 2018/0223893 | A1 * | 8/2018 | Walters | B25F 5/029 |
| 2018/0313389 | A1 * | 11/2018 | Walters | B25B 15/00 |
| 2019/0126446 | A1 * | 5/2019 | Irwin | B25B 21/002 |
| 2019/0351535 | A1 | 11/2019 | Hays et al. | |
| 2020/0147765 | A1 | 5/2020 | Irwin et al. | |
| 2021/0213597 | A1 * | 7/2021 | Magda | B25B 23/0035 |
| 2022/0314415 | A1 * | 10/2022 | Allgaier | B25B 21/007 |

FOREIGN PATENT DOCUMENTS

| | | | |
|---|---|---|---|
| CH | 676812 | | 3/1991 |
| DE | 2750562 | A1 | 5/1979 |
| DE | 3141248 | C2 | 9/1986 |
| DE | 4325995 | A1 | 2/1995 |
| EP | 0248101 | A1 | 12/1987 |
| EP | 0386950 | A1 | 9/1990 |
| EP | 0626239 | A1 | 11/1994 |
| EP | 0738564 | A1 | 10/1996 |
| EP | 0873221 | B1 | 9/1999 |
| EP | 1132179 | | 9/2001 |
| EP | 2977155 | A1 | 1/2016 |
| EP | 2586569 | B1 | 12/2018 |
| GB | 1562129 | A | 3/1980 |
| GB | 2132531 | A | 7/1984 |
| GB | 2147873 | A | 5/1985 |
| GB | 2396131 | A | 6/2024 |
| KR | 1020200059565 | A | 5/2020 |
| WO | 9419156 | A1 | 9/1994 |
| WO | 9529794 | A1 | 11/1995 |
| WO | 9724205 | A1 | 7/1997 |
| WO | 9900221 | A1 | 1/1999 |
| WO | 9955494 | A1 | 11/1999 |
| WO | 0211952 | A1 | 2/2002 |
| WO | 2003051100 | A1 | 6/2003 |
| WO | 2022082177 | A1 | 4/2022 |
| WO | 2023278982 | A1 | 1/2023 |

OTHER PUBLICATIONS

U.S. Appl. No. 29/754,824, filed Oct. 14, 2020, Troy Hale.

U.S. Appl. No. 63/215,597, filed Jun. 28, 2021, Adam Tillinghast.

Camo Drive Tool available from https://www.camofasteners.com/products/drive/camo-drive/ (Retrieved Mar. 3, 2021).

DeWalt Collated Screw Gun Attachment available from https://www.homedepot.com/p/DEWALT-Collated-Screw-Gun-Attachment-DCF6201/206468794 (Retrieved Aug. 25, 2020).

Dewalt Shear Attachment available from https://www.dewalt.com/products/power-tools/polishers-shears-and-nibblers/18ga-shear-attachment/dwashrir (Retrieved Aug. 27, 2020).

Drywall Screwgun Corded Magazine Attachment Autofeed Screwdrive available at https://www.alibaba.com/product-detail/Drywall-Screwgun-Corded-Collated-Magazine-Attachment_60586522232.html (Retrieved Aug. 25, 2020).

Hilti, Interior Finishing Trade Catalog (2017) available from https://www.hilti.dz/content/dam/documents/dz-document-houha/IF.pdf (2017).

QuikDrive PRODW Drywall System available from https://lbmjournal.com/quik-drive-prodw-drywall-system/ (retrieved Aug. 27, 2020).

Squids Power Tool Trap Product Spec Sheet available from https://www.ergodyne.com/squids-3780-power-tool-trap.html (Retrieved Mar. 3, 2021).

* cited by examiner

FASTENER INSTALLATION SYSTEMS AND ADAPTERS

CROSS-REFERENCE

This application claims the benefit of U.S. Provisional Application No. 63/091,701, filed Oct. 14, 2020, entitled FASTENER FEEDING SYSTEMS, METHODS AND DEVICES, which application is incorporated herein in its entirety by reference.

BACKGROUND

Professional grade tools and systems that enable an auto-feed of fasteners during installation processes provide both valuable time-savings and increased accuracy during installation for professionals in the construction industry. These tools are used for a variety of projects including, for example, deck replacement, and sheathing applications. The current professional grade solutions involve attaching a driving attachment to a screw gun designed for use with the driving attachment. An extender can be provided between the driving attachment and screw gun.

For the do-it-yourself (DIY) home improvement project or the semi-professional with an occasional use for such a tool, the expense of purchasing a specialty tool for fastener installation is not practical. As a result, DIY projects and semi-professional projects typically do not benefit from the time-saving, highly accurate installation that the professional grade tools enable.

What is needed are systems, tools, methods and kits that enable an auto-feed of fasteners during an installation process that can adapt, for example, a commonly available drill or other electronic driver to securely engage a driving attachment.

SUMMARY

Disclosed are fastener feeding systems, devices, methods and kits for driving and auto-feed driving of fasteners, including collated fasteners, into a target surface using a power tool such as a drill or other electronic driver. The fastener feeding systems includes a driving attachment adapter operable to engage a chuck of a power tool on a first end and a driving attachment on an opposing end.

Fastener installation systems are disclosed: The fastener installation systems includes a power driver having a power source; a fastener delivery attachment having an adapter release button on an exterior surface, a slide body coupled to an attachment body for reciprocal displacement in a retraction stroke wherein the fastener delivery attachment is configured to deliver one or more fasteners; an adapter comprising a first end operable to engage the power driver and a second end having a spline with teeth operable to engage the fastener delivery attachment; and a torque transmitter operable to transmit torque from the power driver to the one or more fasteners. Another disclosed fastener installation system can include a power driver having power source; a fastener delivery attachment having a slide body coupled to an attachment body for reciprocal displacement in a retraction stroke wherein the fastener delivery attachment is configured to deliver one or more fasteners; an adapter comprising a first end operable to engage the power driver, a second end having a spline with teeth operable to engage the fastener delivery attachment, and a handle extending from an adapter body; and a torque transmitter operable to transmit torque from the power driver to a fastener of the one or more fasteners. Fastener installation systems can also comprise: a power driver having a power source; a fastener delivery attachment having a slide body coupled to an attachment body for reciprocal displacement in a retraction stroke wherein the fastener delivery attachment is operable to deliver one or more fasteners; an adapter comprising a first end operable to engage the power driver, a second end operable to engage the fastener delivery attachment, and a strap; and a torque transmitter operable to transmit torque from the power driver to a fastener of the one or more fasteners.

Fastener installation adapters are also disclosed. The fastener installation adapters can comprise: an adapter body comprising a first end operable to engage a power driver and a second end having a spline with teeth operable to engage a fastener delivery attachment; and a handle extending from an adapter body. Other configurations of a fastener installation adapter comprise: an adapter body comprising a first end operable to engage a power driver and a second end having a spline with teeth operable to engage a fastener delivery attachment; and a strap.

The handle of the adapter is operable to at least one of extend away from the adapter body and rotate in a forward and rearward direction.

Fastener delivery attachment devices can comprise: a slide body coupled to an attachment body for reciprocal displacement in a retraction stroke wherein the fastener delivery attachment is operable to deliver one or more fasteners, and a one-piece adapter release button on an exterior surface wherein the release button has two arms with a ramp positioned on an interior surface of each arm. Fastener delivery attachment devices can also comprise: a slide body coupled to an attachment body for reciprocal displacement in a retraction stroke wherein the fastener delivery attachment is operable to deliver one or more fasteners, and an elongated channel aperture in communication with the pass-through window.

The fastener delivery attachment can also include a fastener pass-through window. The fastener pass-through window can also have a shelf surface operable to support a fastener or fastener strip. An elongated channel aperture can also be provided that is in communication with the pass-through window.

Methods of using the devices and associated kits are also disclosed.

INCORPORATION BY REFERENCE

All publications, patents, and patent applications mentioned in this specification are herein incorporated by reference to the same extent as if each individual publication, patent, or patent application was specifically and individually indicated to be incorporated by reference.

U.S. Pat. No. 3,910,324 A published Oct. 7, 1975 to Nasiatka;

U.S. Pat. No. 4,018,254 A published Apr. 19, 1977 to DeCaro;

U.S. Pat. No. 4,019,631 A published Apr. 26, 1977 to Lejdegard et al.;

U.S. Pat. No. 5,083,483 A published Jan. 28, 1992 to Takaji;

U.S. Pat. No. 5,144,870 A published Sep. 8, 1992 by Nick;

U.S. Pat. No. 6,109,145 A published Aug. 29, 2000 by Habermehl;

U.S. Pat. No. 6,109,144 A published Aug. 29, 2000 by Muro;

U.S. Pat. No. 6,862,963 B2 published Mar. 8, 2005 by Habermehl et al.;

U.S. Pat. No. 6,941,847 B2 published Sep. 13, 2005 by Habermehl et al.;

U.S. Pat. No. 7,134,367 B2 published Nov. 14, 2006 by Gehring et al.;

U.S. Pat. No. 7,341,146 B2 published Mar. 11, 2008 by Habermehl;

U.S. Pat. No. 9,701,032 B2 published Jul. 11, 2017 by Moss et al.;

U.S. Pat. No. 10,675,741 B2 published Jun. 9, 2020 by Chiang;

U.S. Publication US 2007/0079672 A1 published Apr. 12, 2007 by Bone et al.;

U.S. Publication US 2016/0000449 A1 published Jan. 7, 2016 by Aman et al.;

U.S. Publication US 2019/0351535 A1 published Nov. 21, 2019 by HAYS et al.;

U.S. Publication US 2020/0147765 A1 published May 14, 2020 by Irwin et al.;

European Patent EP 2586569 B1 issued Dec. 26, 2018 by Marcon;

Camo Drive Tool https://www.camofasteners.com/products/drive/camo-drive/;

Collated Screw Gun Attachment https://www.homedepot.com/p/DEWALT-Collated-Screw-Gun-Attachment-DCF6201/206468794;

Dewalt Polisher https://www.dewalt.com/products/power-tools/polishers-shears-and-nibblers/18ga-shear-attachment/dwashrir;

Drywall Screwgun Corded Magazine Attachment Autofeed Screwdrive https://www.alibaba.com/product-detail/Drywall-Screw-gun-Corded-Collated-Magazine-Attachment_60586522232.html;

Interior Finishing Trade Catalog (2017) https://www.hilti.dz/content/dam/documents/dz-document-nouha/IF.pdf/pdf;

QuikDrive PRODW Drywall System https://Ibmjournal.com/quik-drive-prodw-drywall-system/; and Squids Power Tool Trap https://www.ergodyne.com/squids-3780-power-tool-trap.html

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

I. System

Figure 1A:
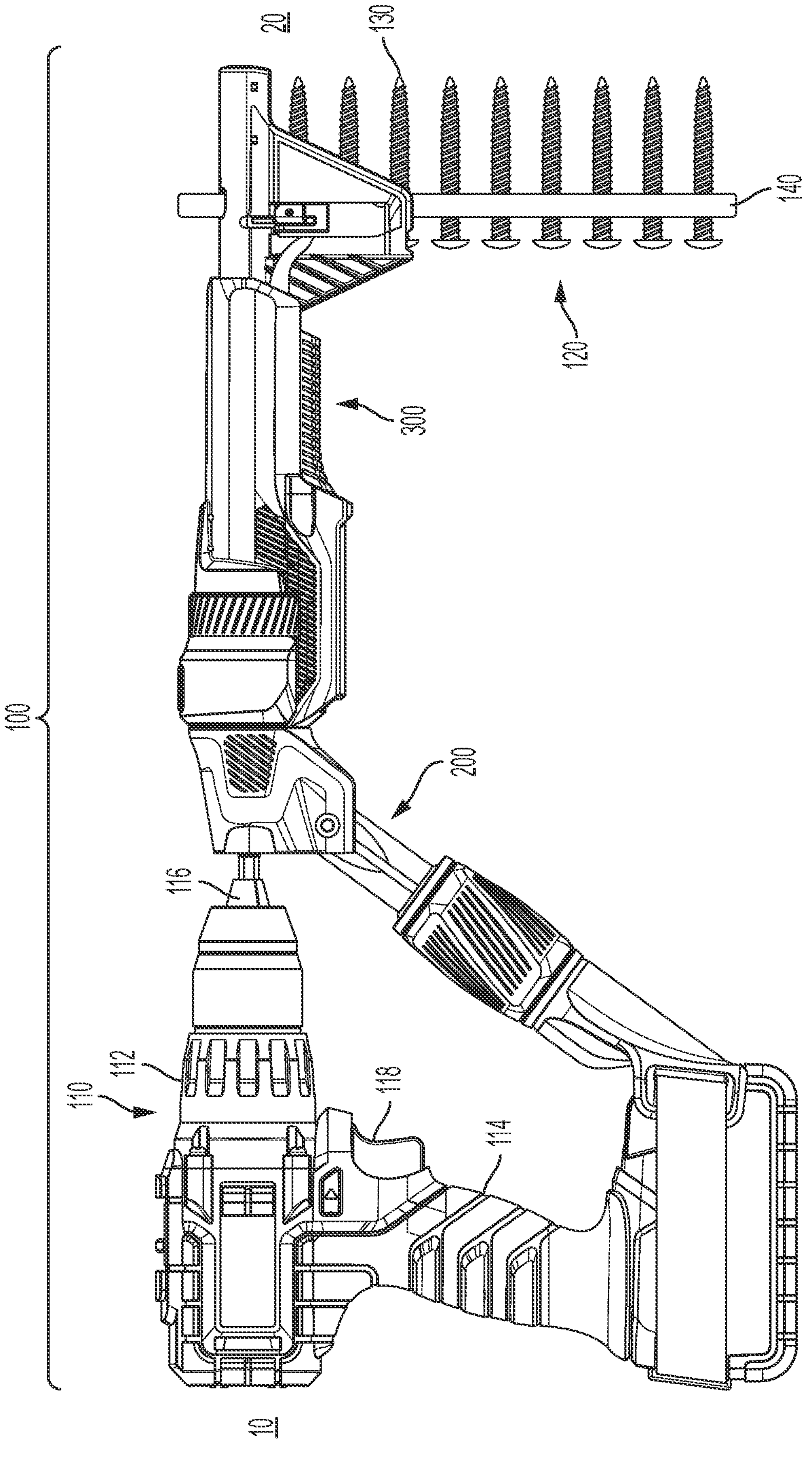
FIG. 1A is a side view of a system comprising a power driver, a driving attachment adapter; a driving attachment; and a fastener strip.

Fastener installation systems 100 are provided: The fastener installation system 100 includes a power driver 110 having a power source (not shown); a fastener delivery attachment 300 having an adapter release button 350 on an exterior surface, a slide body 310 coupled to an attachment body 320 for reciprocal displacement in a retraction stroke wherein the fastener delivery attachment 300 is configured to deliver one or more fasteners 130; an adapter 200 comprising a first end operable to engage the power driver 110 and a second end having a spline 220 with teeth 222 operable to engage the fastener delivery attachment 300; and a torque transmitter 500 operable to transmit torque from the the power driver 110 to the one or more fasteners 130 at a second end. Another fastener installation system 100 can include a power driver 110 having power source (not shown); a fastener delivery attachment 300 having a slide body 310 coupled to an attachment body 320 for reciprocal displacement in a retraction stroke wherein the fastener delivery attachment 300 is configured to deliver one or more fasteners 130; an adapter 200 comprising a first end operable to engage the power driver 110, a second end having a spline 220 with teeth 222 operable to engage the fastener delivery attachment 300, and a handle 230 extending from an adapter body 210; and a torque transmitter 500 operable to transmit torque from the power driver 110 to a fastener 130 of the one or more fasteners 130 at a second end. Fastener installation systems 100 can also comprise: a power driver 110 having a power source (not shown); a fastener delivery attachment 300 having a slide body 310 coupled to an attachment body 320 for reciprocal displacement in a retraction stroke wherein the fastener delivery attachment 300 is operable to deliver one or more fasteners 130; an adapter 200 comprising a first end operable to engage the power driver 110, a second end operable to engage the fastener delivery attachment 300, and a strap 240; and a torque transmitter 500 operable to transmit torque from the power driver 110 to fastener 130 of the one or more fasteners 130.

The fastener delivery attachment can 300 further comprise a fastener pass-through window 370. The fastener pass-through window 370 can have a shelf 376 surface configured to support a fastener 130. The fastener pass-through window 370 can also be in communication with an elongated channel aperture 332. The adapter 200 can also have a handle 230 that is operable to extend away from an adapter body 210 and/or rotate in a forward and rearward direction. A strap 240 that engages the power driver 110. A fastener strip 120, such as a collated fastener strip, can also be provided as part of the fastener installation system 100. The torque transmitter 500 can include a shaft 328, a coupler spring 522 and a coupler 512. The torque transmitter 500 can also include one or more of a cross-pin 712, a tab 714, an e-clip 720, a shoulder 704, a milled flat 716 and a coupler slot 516. The handle 230 of the adapters is also operable to at least one of extend away from the adapter body 210 and rotate in a forward and rearward direction.

Turning now to FIG. 1A a side view of a fastener delivery system 100 comprising (from the first end 10 to the second end 20) a power driver 110 is illustrated. An adapter 200, a driving attachment 300, and a fastener strip 120 having a plurality of fasteners 130 connected by a retaining strap 140, such as a collated screw strap. The first end 10 is generally proximal (i.e., closer to a user) and the second end is generally distal (i.e. further away from a user). The power driver 110 has or engages a power source (not shown) which can include, for example, a power cord configured to plug into a wall outlet or a battery pack.

Figure 1B:
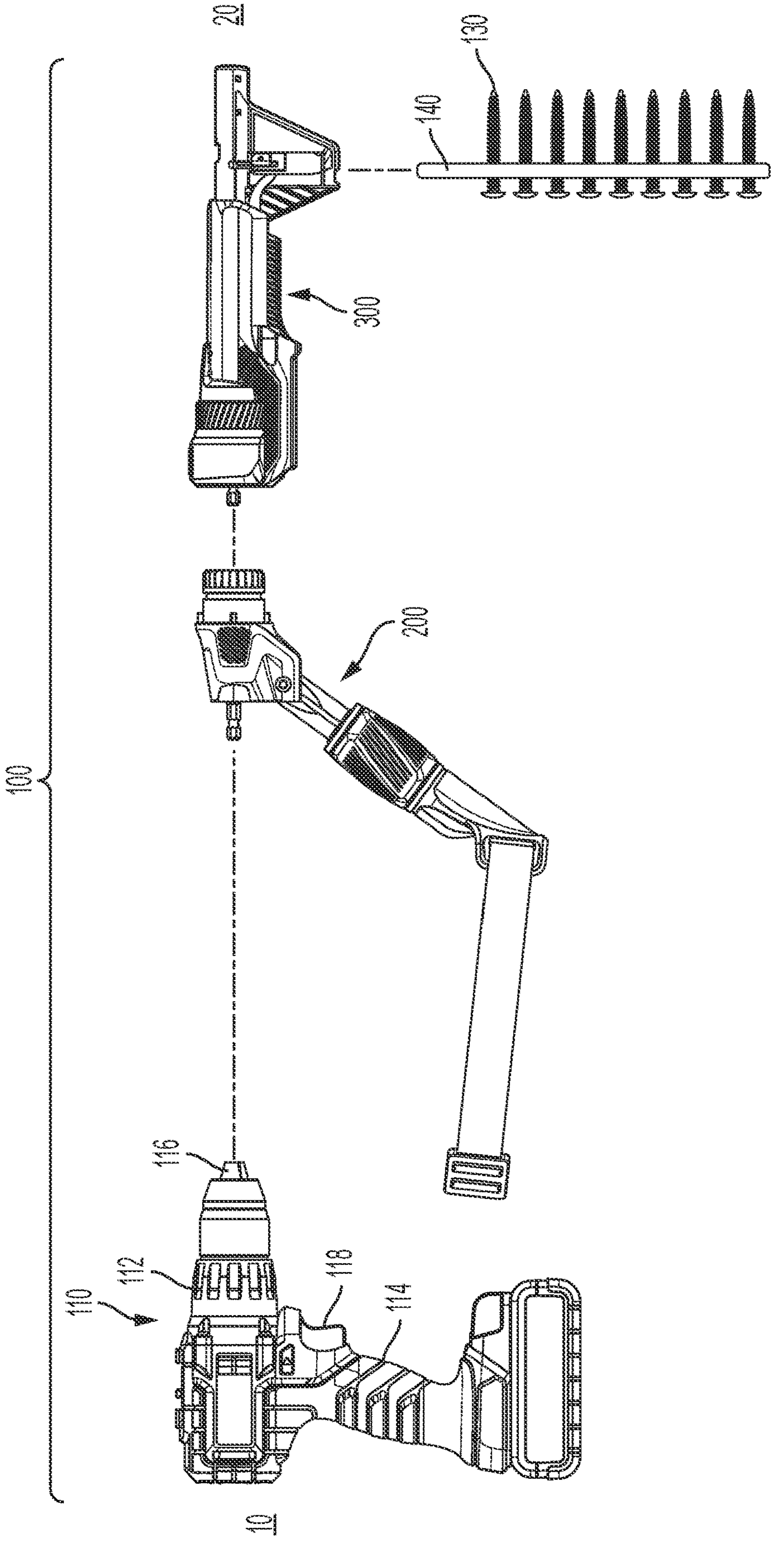
FIG. 1B is an exploded side view of the system of FIG. 1A.

FIG. 1B is an exploded side view of the fastener delivery system 100 of FIG. 1A with each component shown separated, i.e., prior to engaging the components to result in the fastener delivery system. The power driver 110 has a driver body 112 with a handle 114 and on/off controller 118 (e.g., trigger) and a chuck 116. The power driver 110 can be, for example, a drill or an impact driver. When a drill is used, the chuck 116 may have a collapsible jaw that is sized and configured so that it operable to engage a shank of, for example, a drill bit, or as illustrated with the adapter as shank 212, and illustrated with the attachment as shank 312. The fastener strip 120 comprises a retaining strap 140 and a plurality of fasteners 130. The retaining strap 140 further comprises an elongate thin band with a plurality of interconnected sleeves. A single fastener 130 is received within each sleeve so that a single sleeve secures a single fastener. Each fastener 130 is substantially symmetrical about a central longitudinal axis. The head of the fastener 130 has a recess in its top surface configured for engagement by a screwdriver bit during use once the fastener 130 is loaded into the chamber of the driving attachment 300.

To compensate for the variability between various commercially power drivers, e.g., between different drills and/or impact drivers, an adapter 200 can be provided between the power driver 110 and a driving attachment 300. The adapter 200 ensures consistent transfer of power from the power driver 110 to the driving attachment. The use of the adapter 200 also allows the driving attachment 300 to be used by a power driver 110 having a standard chuck 116 instead of a screw gun.

II. Adapter

Fastener installation adapters 200 can comprise: an adapter body 210 comprising a first end operable to engage a power driver 110 and a second end having a spline 220 with teeth 222 operable to engage a fastener delivery attachment 300; and a handle 230 extending from an adapter body 210. Other configurations of a fastener installation adapter 200 comprise: an adapter body 210 comprising a first end operable to engage a power driver 110 and a second end having a spline 220 with teeth 222 operable to engage a fastener delivery attachment 300; and a strap 240.

The handle 230 of the adapter 200 is operable to at least one of extend away from the adapter body 210 and rotate in a forward and rearward direction.

Figure 2A:
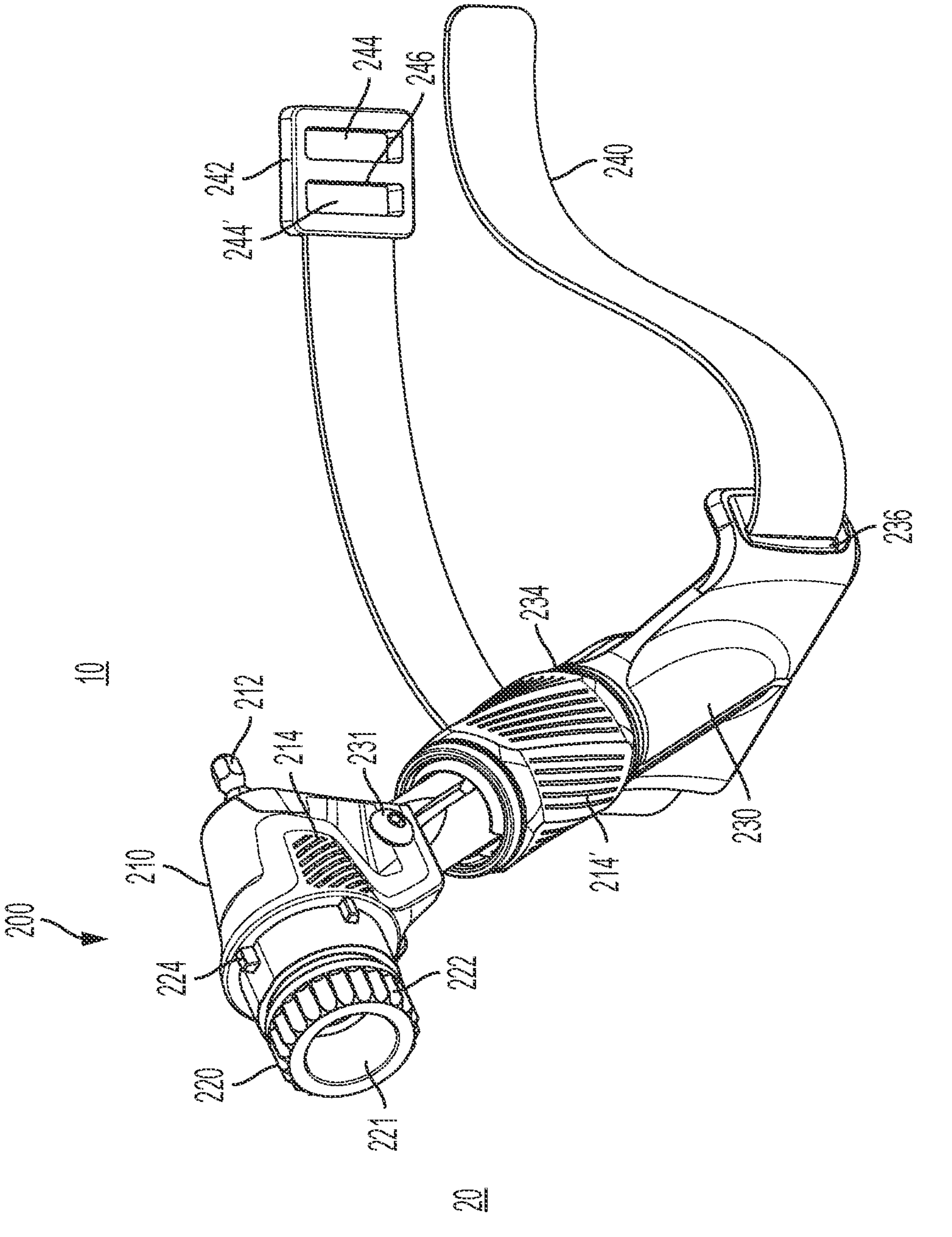
FIG. 2A is a front perspective exterior view of the adapter.
Figure 2B:
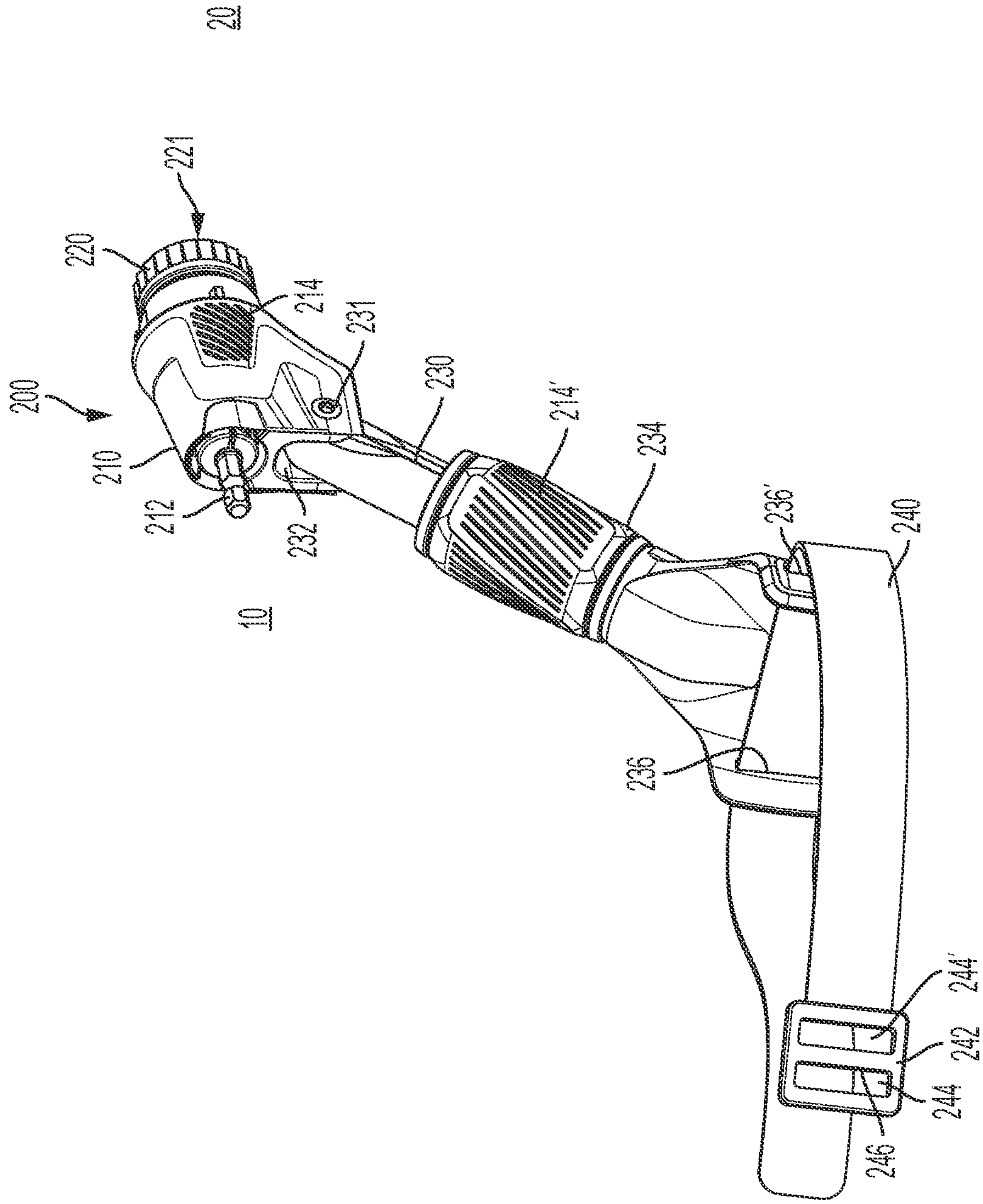
FIG. 2B is a rear perspective exterior view of the adapter.
Figure 2C:
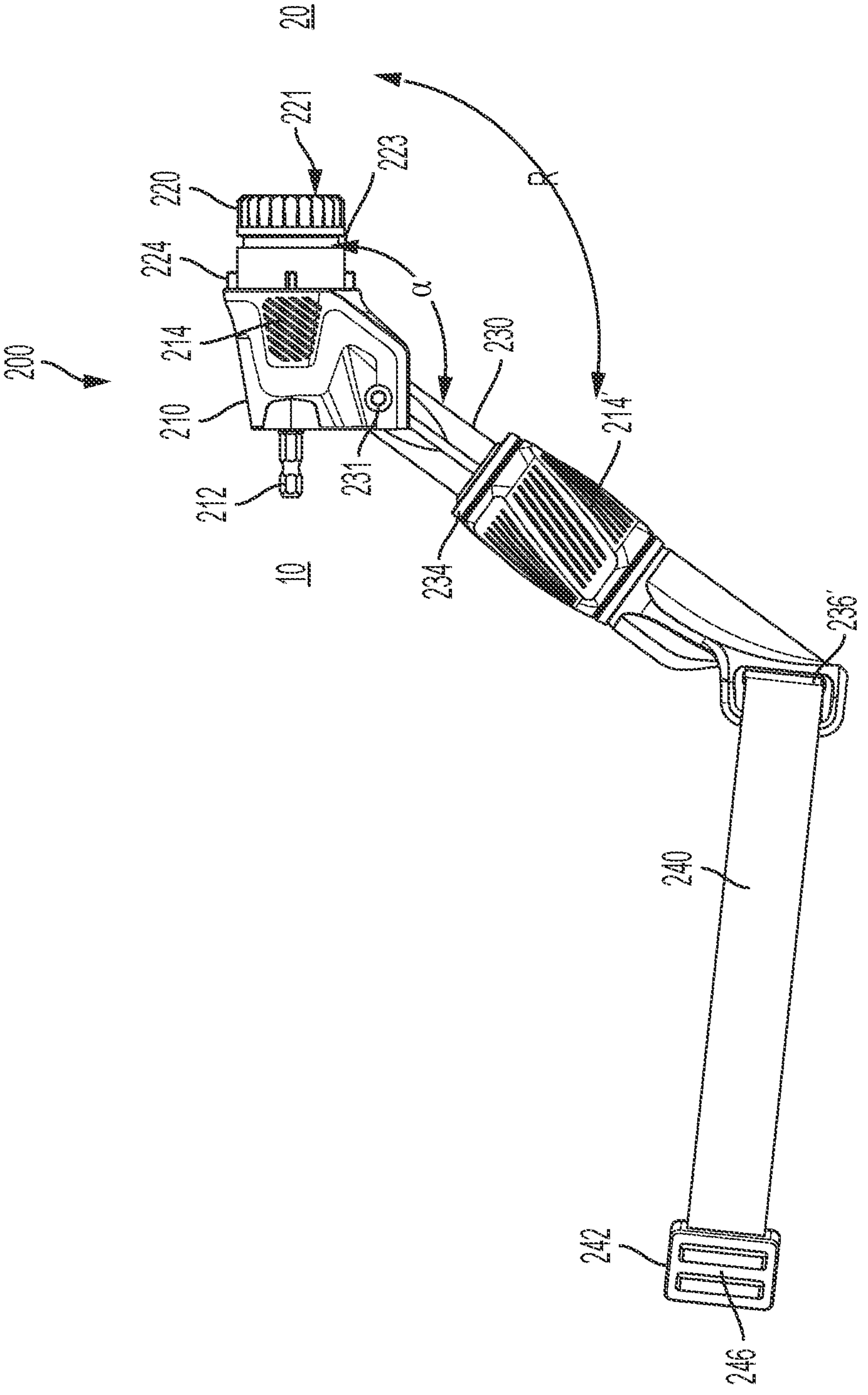
FIG. 2C is a side view of the adapter.

Turning now to FIGS. 2A-C a front perspective exterior view, a rear-perspective exterior view and a side view of an adapter 200 for a driving attachment 300 is illustrate. The adapter 200 has an adapter body 210 with a shank 212 on a first end 10. The shank 212 is, for example, a hex shank configurable to engage the jaw of the chuck of the power driver in FIG. 1 when the system is fully assembled. The second end 20, opposing end to the first end 10, of the adapter body 210 has a spline 220 with a plurality of cut teeth 222 on an exterior surface. A distal adapter groove 223 is provided between the teeth and the spline. Recessed from the teeth 222 of the spline 220 on a cylindrical portion of the body are a plurality of nubs 224 or protuberances extend from the surface of the adapter body 210. The nubs 224 engage with recesses in the driving attachment 300 to prevent rotation between the adapter 200 and the driving attachment 300 (shown in FIG. 1). The nubs 224 also allow for indexing, e.g., a plurality of fixed rotational positions, to provide the user more flexibility for positioning. For example, if the fastener strip 120 is in a tight workspace and the user needs more visibility of the fasteners 130, the indexing feature allows the relative orientation of the adapter 200 and the driving attachment 300 to be changed. The nubs 224 engage one or more protrusions 364 on an interior surface of the fastener driving attachment as shown in FIG. 3B. The protrusions 364 act as a stop surface to prevent rotation of the driving attachment 300 and the adapter 200. The shank 312 is, for example, a hex shank as described above. The distal end of the adapter is operable to receive, for example, a shaft, such as shaft 328 in FIG. 3G. The shaft is receivable within a cavity 225 in the a central opening 221 of the adapter 200.

As illustrated, a handle 230 is provided which is rotatable and extends from an exterior surface of the adapter body 210. The rotatable handle 230 is configurable to rotate R in a first direction (towards first end 10) and a second direction (towards second end 20) as shown in FIG. 2C over a degrees, e.g. a range of up to 180 degrees. The pivot joint 232 is a u-shaped surface where the handle 230 engages the adapter body 210, the pivot joint 232 allows the handle 230 to rotate within the u-shaped surface about an axis passing through the pivot joint 232. The pivot joint 232 can also be configurable to lock once a desired angle $\alpha$ for the rotatable handle 230 is achieved by the user. As will be appreciated by those skilled in the art, when the strap is secured about the power driver 110 (in FIG. 1), the strap 240 secures the handle 230 to the power driver 110 and prevents movement of the handle 230 within the pivot joint 232. As noted below, securing the strap 240 also aids in preventing rotation of the adapter 200 relative to the power driver 110.

As will be appreciated from FIGS. 2A-C, 2F and 2G, the handle 230 can also be configured to have an adjustable length by providing, for example, a telescoping and locking mechanism. A twistable length lock 234 is provided that allows the user to secure the handle 230 at a desired length after moving a first handle member 238 towards or away from a second tubular member 238' to either lengthen (away from the adapter body 210) or shorten (towards from the adapter body 210) the total length of the handle 230. The first handle member 238 is a first tubular member 233 with a channel 237. The second tubular member 238' is a hollow tubular member with a second tubular member channel 239 and a rail 239' where the rail 239' is configured to mate with the channel 237 of the first tubular member 233 and the second tubular member channel 239 allows the diameter of the second tubular member 238' to be reduced during the locking process.

A strap 240 can be provided which allows the handle 230 to be secured to a portion of the power driver 110 as shown in FIG. 1. Securing the handle 230 to the power driver provides additional stability to the adapter 200 and the driving attachment 300 during use when torque is transmitted from the power driver to the driving attachment. Securing the handle 230 to the power driver also prevents spinning of the driving attachment 300 during use.

Surface texture 214, 214', such as a plurality of ridges, can be provided on the external surface of the adapter body 210 and the handle 230 to improve the tactile interface with the device. As will be appreciated by those skilled in the art, other or additional surface treatment can be used without departing from the scope of the disclosure. Additional surface treatment can include one or more, including combinations, of strips, sloping surfaces, dimples, recesses, and depressions.

Figure 2E:
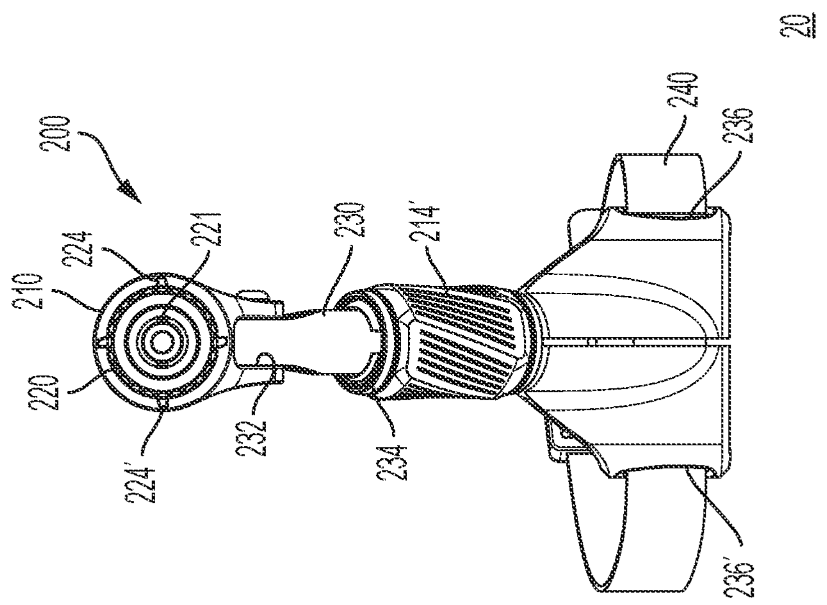
FIG. 2E is a front view of the adapter.
Figure 2D:
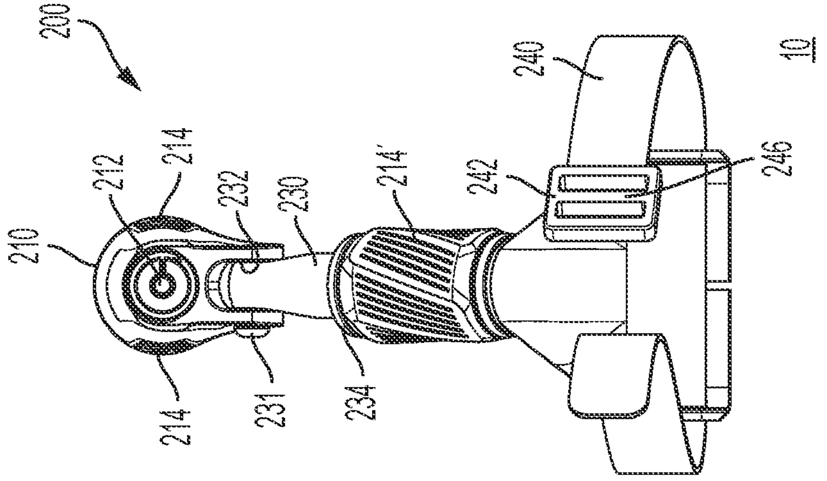
FIG. 2D is a rear view of the adapter.

FIG. 2D is a view of the adapter 200 from the first end 10. From the first end view, the handle 230 is positioned partially surrounded by a u-shaped surface of the pivot joint 232 of the adapter body 210. A locking mechanism 231 is provided on the side of the adapter 200 which passes through an aperture in the pivot joint 232 and at least a portion of the handle 230. In some configurations, the locking mechanism 231 can be pressed inward by the user during use to disengage the mechanism which then allows the handle 230 to rotate in a front-to-back and back-to-front direction (e.g., towards the first end 10 or towards the second end 20). The locking mechanism 231 can alternatively function as a high friction feature that allows smooth rotation when gentle leverage is applied but prevents free rotation from gravity while the user is attaching the strap to the drill. Thus, in some configurations, the locking mechanism holds its rotational position but is not necessarily locked into the position. The shank 212 extends from the first end and is engagable by the power driver. The strap 240 can be configured to engage the handle 230 at an end opposite the pivot joint 232, or be positioned along the length of the handle. The handle 230 can be provided with a first strap aperture 236 on a first side of the handle 230 and a second strap aperture 236' on a second side of the handle 230. The strap 240 can then pass through the apertures to securely engage the handle 230. As illustrated, the strap 240 passes through the apertures so that the strap is in contact with the rear surface of the adapter 200. When the strap 240 engages the power driver 110, the strap 240 is then positioned between the handle 230 and the driver body 112. The strap 240 includes a securement mechanism, such as buckle 242 illustrated. When a buckle 242 is used to secure the handle 230 to the power driver 110, a first end of the strap 240 is secured to the buckle 242 body and a second end can be passed through a first half of a center-opening 244 of the buckle frame, across a center post 246 and through a second half of the center-opening 244'. Other mechanisms for securing the handle via the strap 240 to the power driver can be used without departing from the scope of the disclosure including, for example, Velcro®. FIG. 2G also shows a bushing 250, bearing 252, and an adapter spring 254 which are positioned within the adapter 200.

FIG. 2E, is a front view of the adapter 200. The spline 220 has a circular cross-sectional shape with a central opening 221. A plurality of teeth 222 are positioned on the exterior surface sized and configured to mate with teeth on an interior surface of the fastener adapter.

Figure 2F:
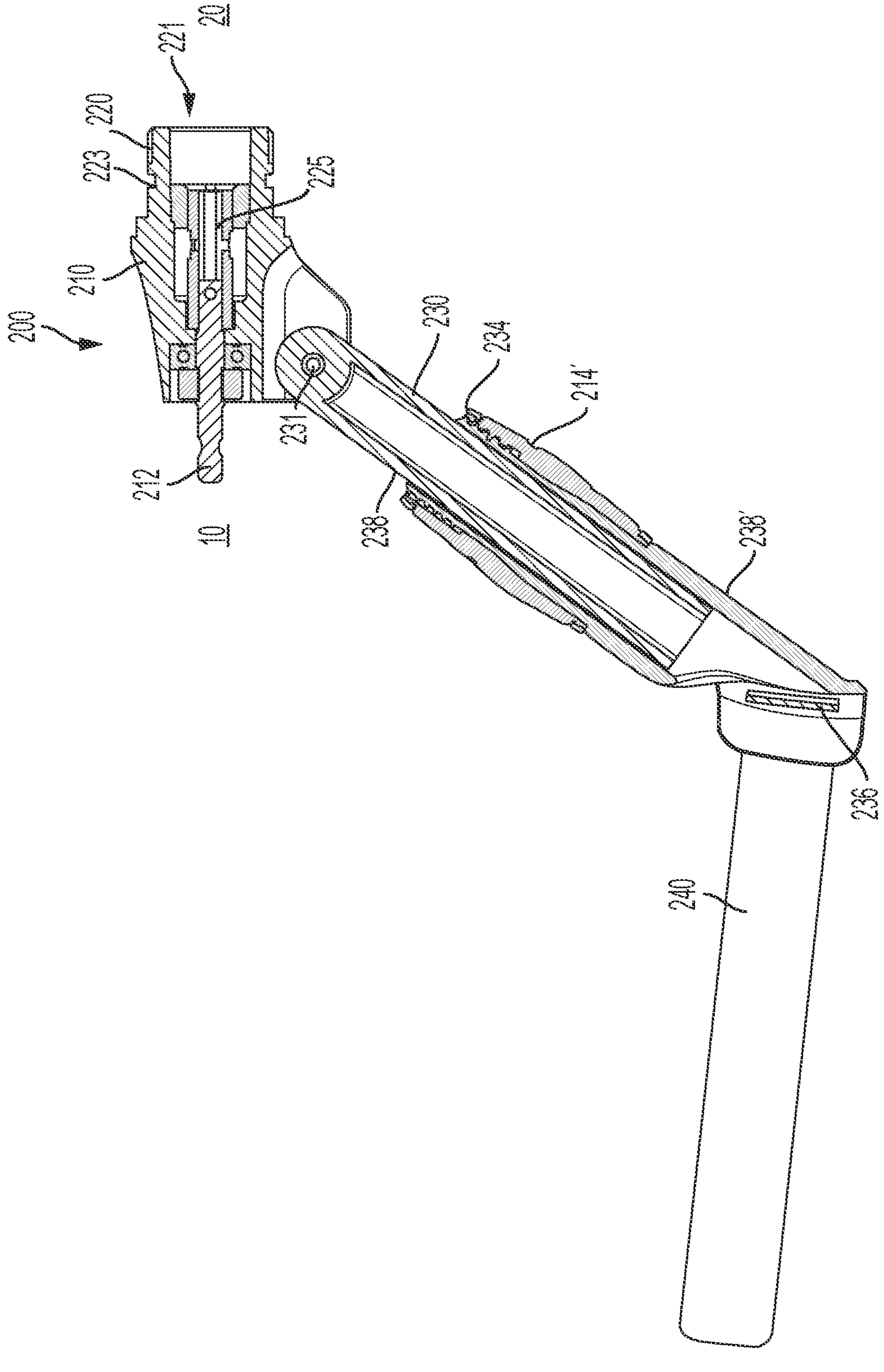
FIG. 2F is a cross-sectional view of the adapter.
Figure 2G:
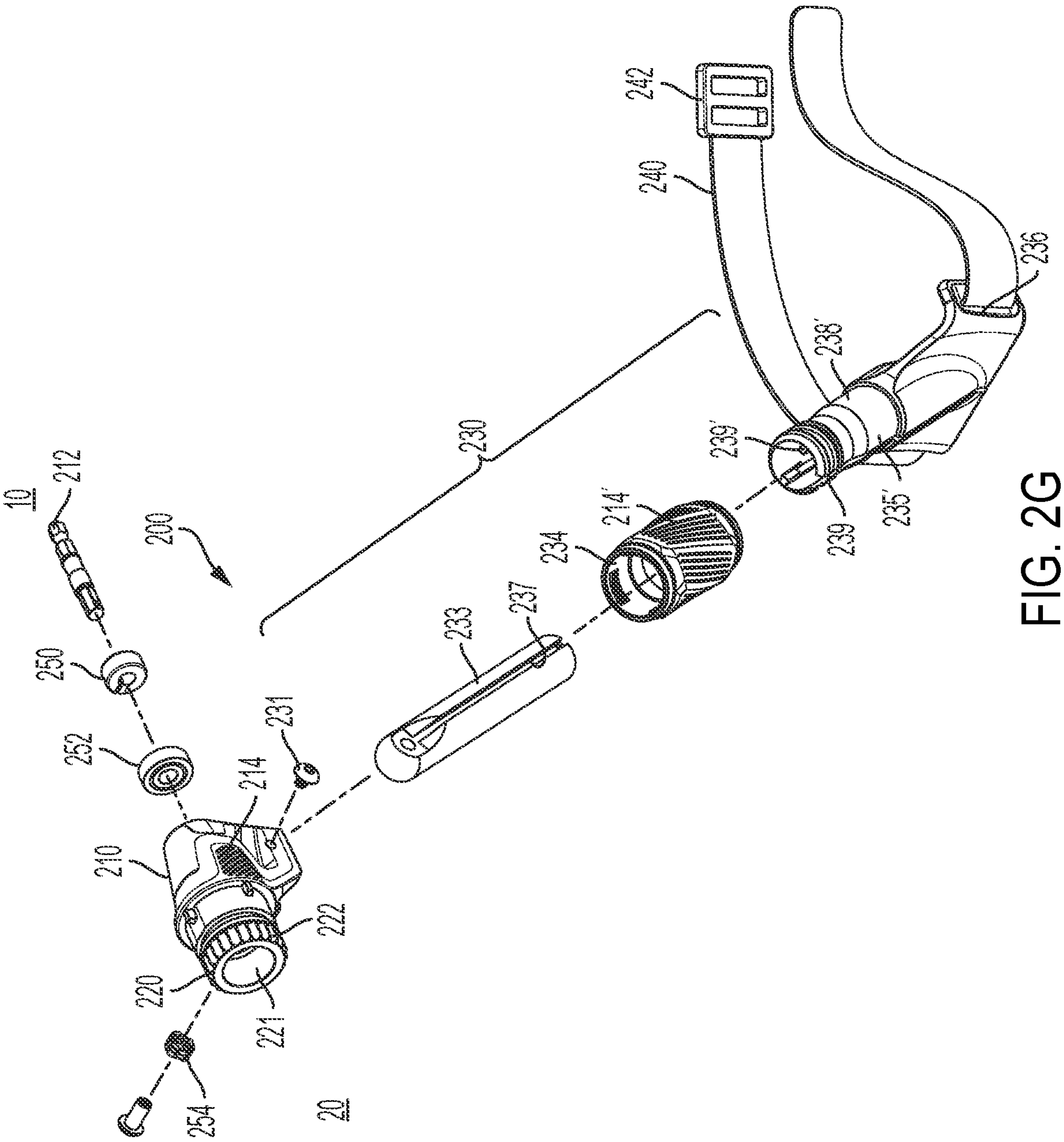
FIG. 2G is an exploded view of the adapter.

FIGS. 2F-G are a cross-sectional view and an exploded view of the adapter 200.

III. Fastener Delivery Device

The fastener delivery attachment can 300 further comprise a fastener pass-through window 370. The fastener pass-through window 370 can have a shelf 376 surface configured to support a fastener 130. The fastener pass-through window 370 can also be in communication with an elongated channel aperture 332. The adapter 200 can also have a handle 230 that is operable to extend away from an adapter body 210 and/or rotate in a forward and rearward direction. A strap 240 that engages the power driver 110. A fastener strip 120, such as a collated fastener strip, can also be provided as part of the fastener installation system 100. The torque transmitter 500 can include a shaft 328, a coupler spring 522 and a coupler 512. The torque transmitter 500 can also include one or more of a cross-pin 712, a tab 714, an e-clip 720, a shoulder 704, a milled flat 716 and a coupler slot 516. The handle 230 of the adapters is also operable to at least one of extend away from the adapter body 210 and rotate in a forward and rearward direction.

Fastener delivery attachment 300 devices can comprise: a slide body 310 coupled to an attachment body 320 for reciprocal displacement in a retraction stroke wherein the fastener delivery attachment 300 is operable to deliver one or more fasteners, and a one-piece adapter release button 350 on an exterior surface wherein the release button has two arms 352, 352' with a ramp 356 positioned on an interior surface of each arm 352, 352'. Fastener delivery attachment 300 devices can also comprise: a slide body 310 coupled to an attachment body 320 for reciprocal displacement in a retraction stroke wherein the fastener delivery attachment 300 is operable to deliver one or more fasteners 130, and a an elongated channel aperture 332 in communication with the pass-through window 370.

The fastener delivery attachment 300 can also include a fastener pass-through window 370. The fastener pass-through window 370 can also have a shelf 376 surface operable to support a fastener 130 or fastener strip 140. An elongated channel aperture 332 can also be provided that is in communication with the pass-through window 370.

Figure 3A:
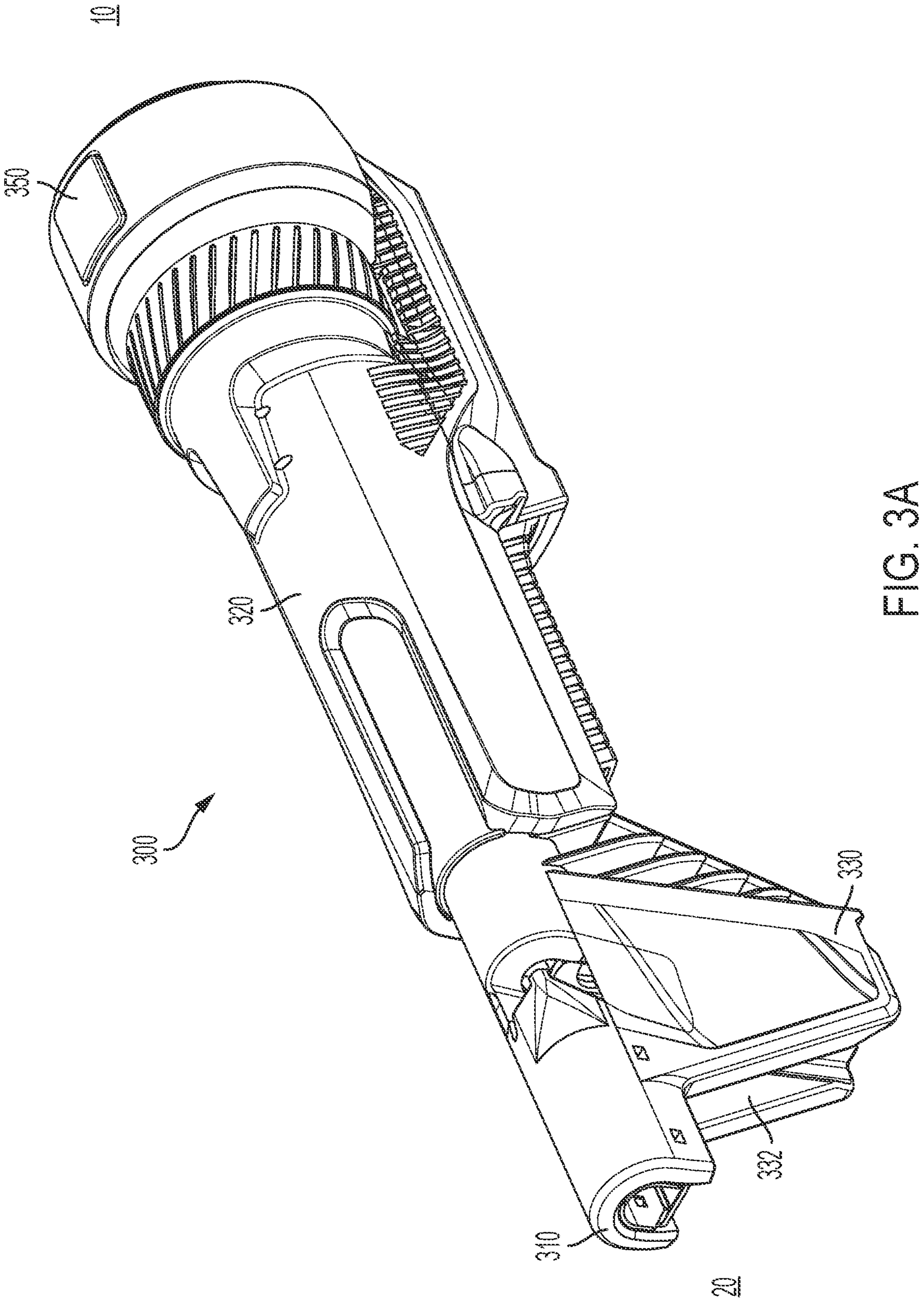
FIG. 3A is a front perspective exterior view of the fastener delivery device.
Figure 3B:
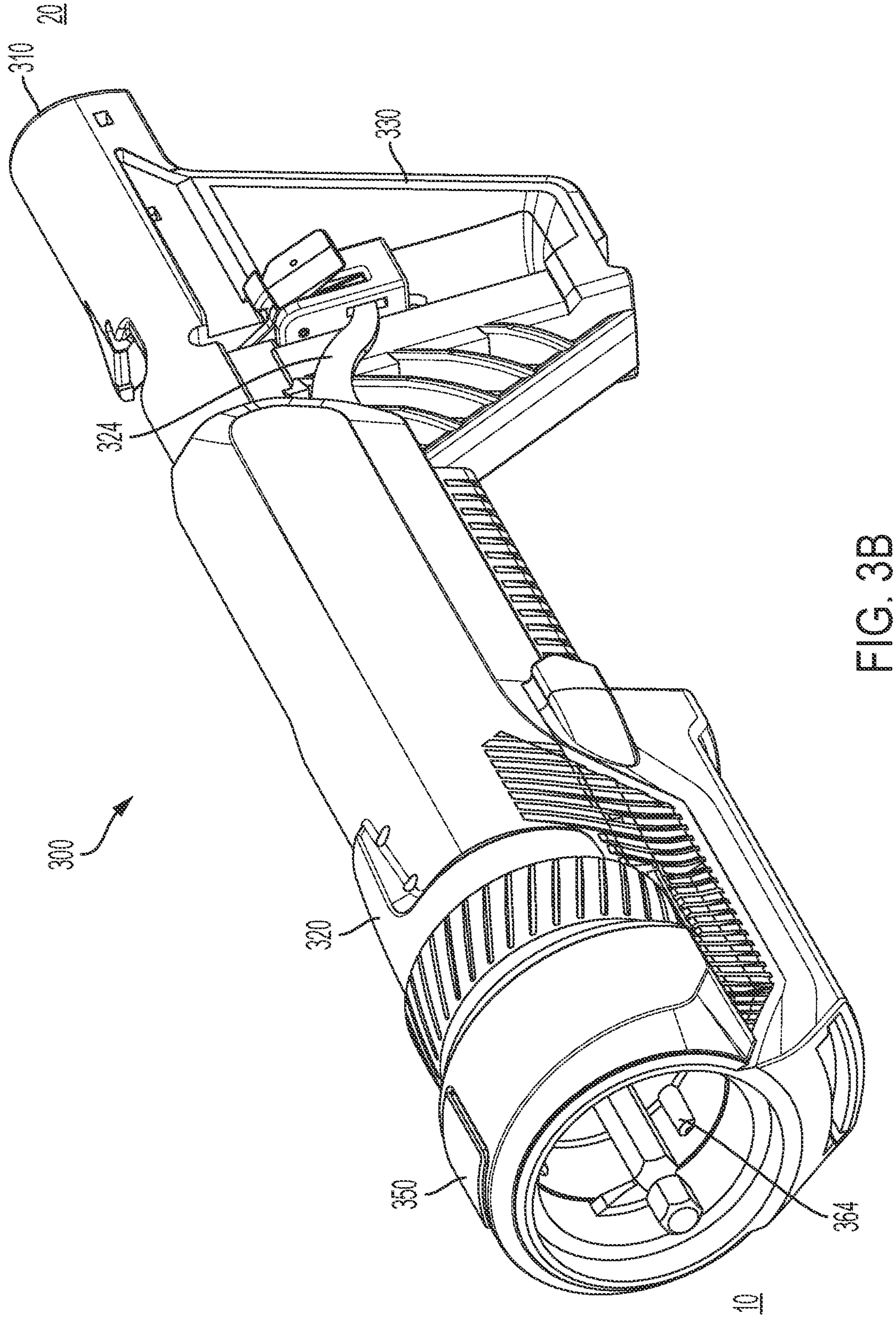
FIG. 3B is a rear perspective exterior view of the fastener delivery device.
Figure 3C:
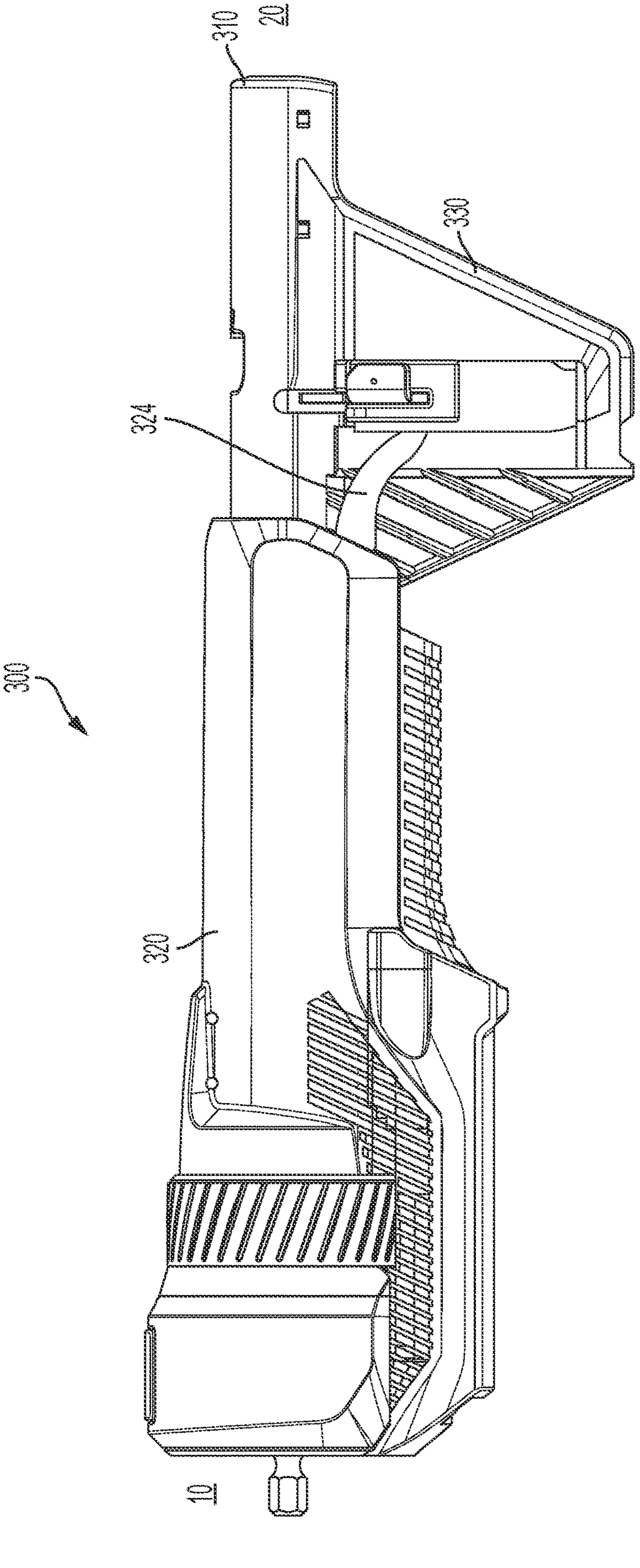
FIG. 3C is a side view of the fastener delivery device.

Turning now to FIGS. 3A-C a front perspective exterior view, a rear perspective exterior view, and a side view of the driving attachment 300 are illustrated The driving attachment 300 can be an auto-feed fastener driving attachment. The driving attachment 300 has a nose 310. The nose 310 is retractable within the driving attachment body 320 such that during use, the nose 310 can slide into the driving attachment body 320 as the fastener is installed in order to achieve a desired installation depth for the fastener. A fastener strip magazine 330 is provided which has a feed channel 332 through which the fastener strip 120 shown in FIG. 1 is fed. One or more protrusions 364 are provided on an interior surface of the driving attachment 300 as shown in FIG. 3B. The protrusions 364 act as a stop surface to prevent rotation of the driving attachment 300 and the adapter 200.

In operation of the driving attachment 300, the nose 310 moves relative the driving attachment body 320 in a cycle of operation in which the rear portion (at the first end 10) of the nose 310 moves relative the driving attachment body 320 in a retracting stroke from an extended position to a retracted position and then moves in an extending stroke from the retracted position to the extended position. A fastener 130 from the retaining strap 140 shown in FIG. 1 is moved through the feed channel 332, which is a fastener strip magazine channel of the fastener strip magazine 330. Feed pawl lever 324 and feed pawl engages the fastener strip to advance a fastener into the delivery channel so that the fastener is delivered via the opening in the nose 310.

Figure 3E:
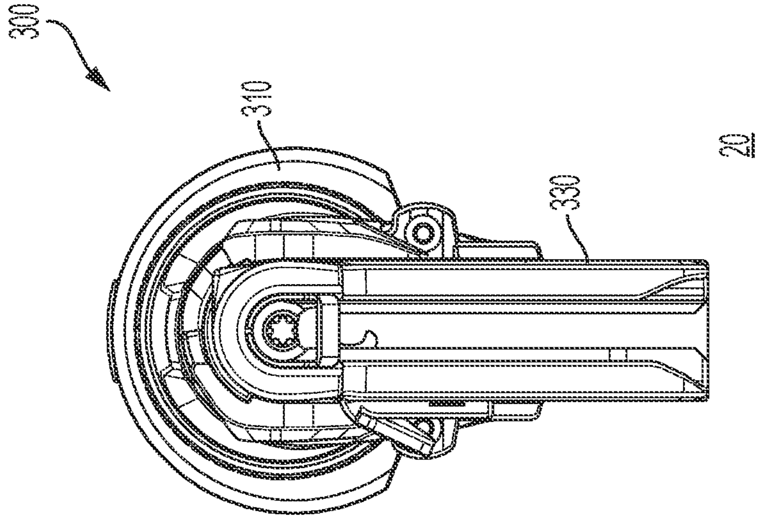
FIG. 3E is a front view of the fastener delivery device.
Figure 3D:
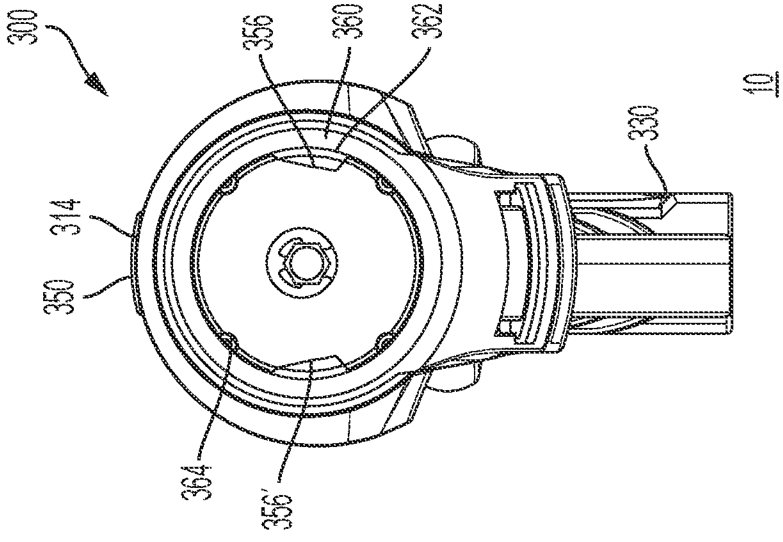
FIG. 3D is a rear view of the fastener delivery device.

FIG. 3D is a first end 10 (rear) view of the driving attachment 300. The quick release button 350 has its interiorly facing ramps 356 passing through a ramp receiving aperture 362 in the inner tubular member 360 (in FIG. 3D). FIG. 3E is a second end 20 (front) view of the driving attachment 300.

Figure 3F:
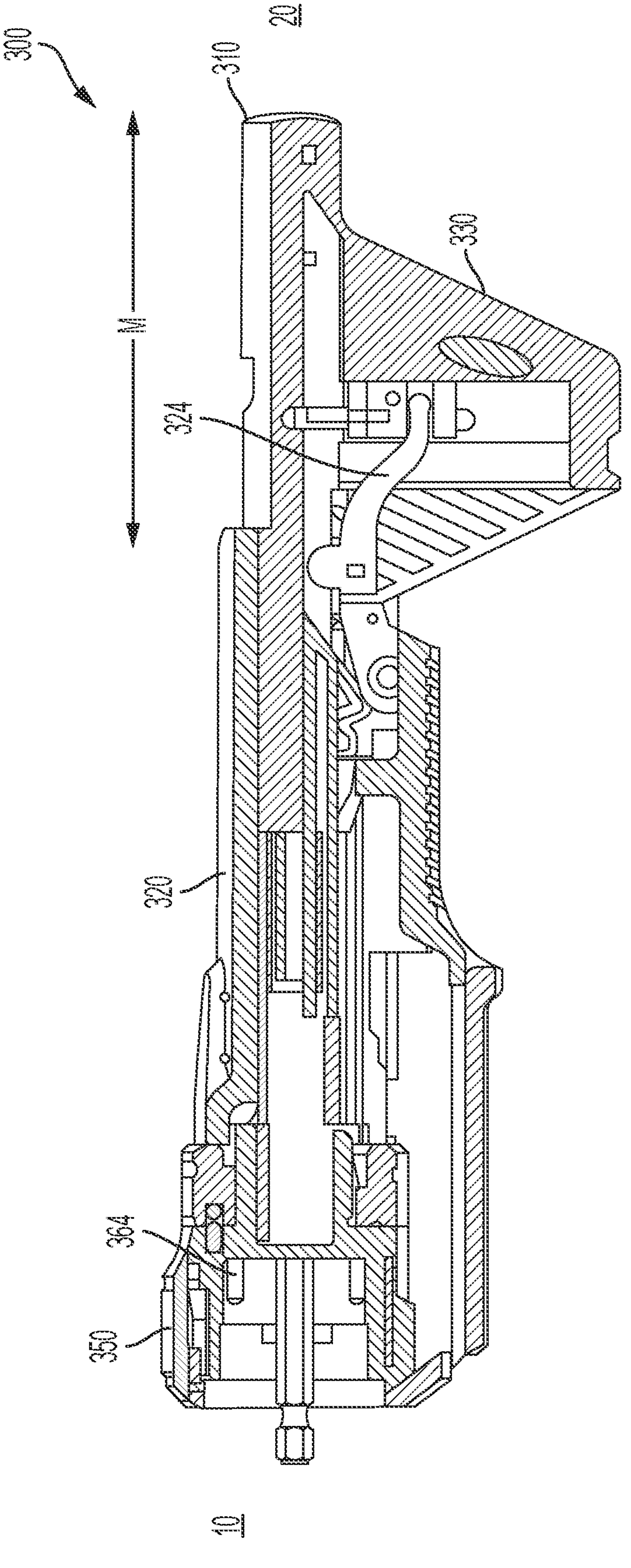
FIG. 3F is a cross-sectional view of the fastener delivery device.
Figure 3G:
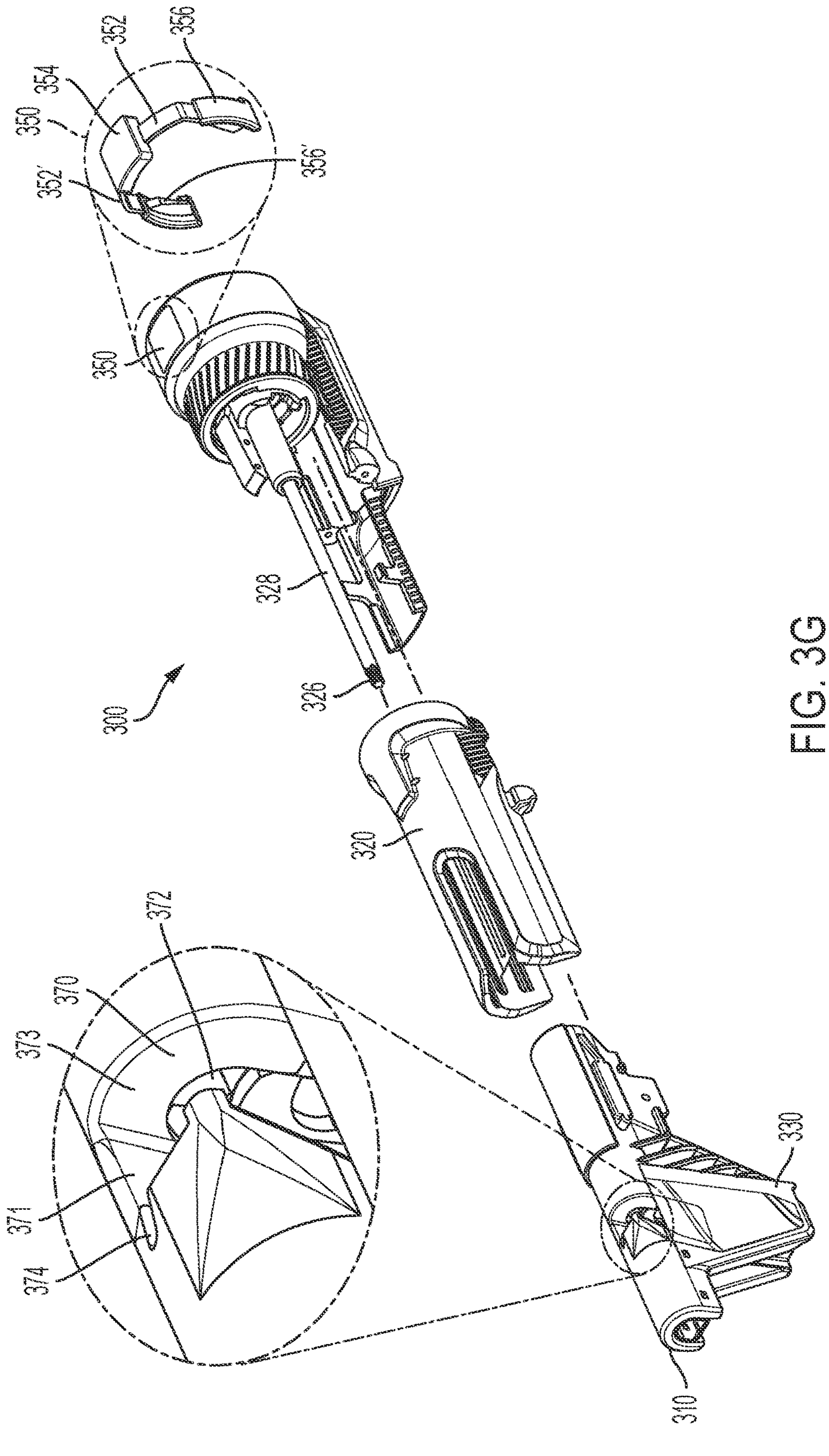
FIG. 3G is an exploded view of the fastener delivery device.
Figure 4A:
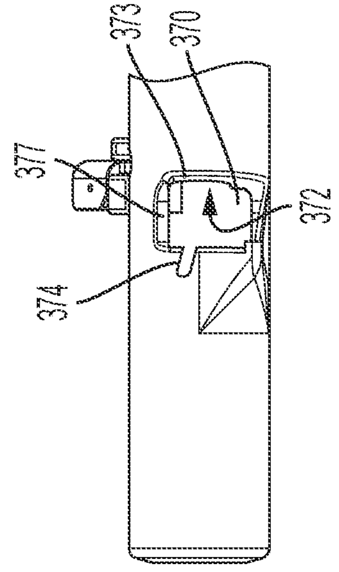
FIGS. 4A-D illustrate the window of the fastener delivery device.
Figure 4B:
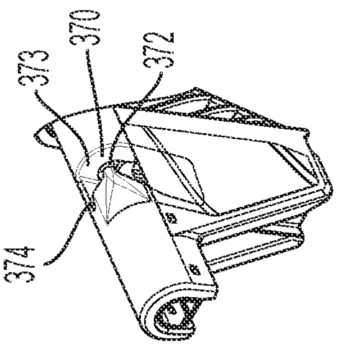
Figure 4C:
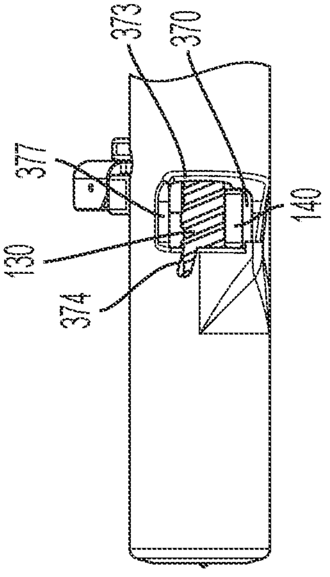
Figure 4D:
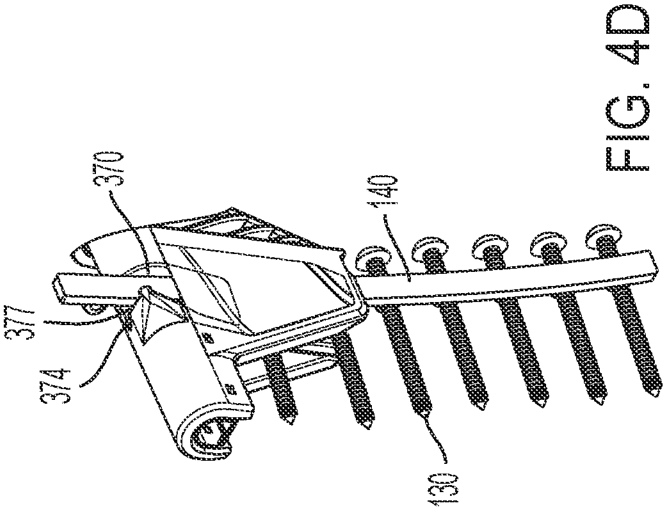

FIGS. 3F-G is a cross-sectional view and an exploded view of the driving attachment 300. The quick release button 350 has a touch point 354 which engages two arms, such as semi-circular arms 352, 352' which are configured to fit around an inner tubular member 360 (in FIG. 3D) of the driving attachment 300. An interior ramp 356, 356' is provided on an interior facing surface of each of the semi-circular arms 352, 352'. The interior ramps 356, 356' are configured to fit within a corresponding ramp receiving aperture 362 on the inner tubular member 360. When the user applies pressure to the touch point 354, the semi-circular arms 352, 352' are moved causing the interior ramps 356, 356' to engage the body of the inner tubular member 360 which causes the semi-circular arms 352, 352' to extend away from a central axis of the device to release the driving attachment 300 from the adapter 200. The ramped surfaces also allow the semi-circular arms 352, 352' to open when the attachment is loaded onto the adapter. The semi-circular arms 352, 352' then relax back automatically to engage with a distal adapter groove 223 on the adapter, thus locking the adapter in place.

As will be appreciated by those skilled in the art, a one-piece adaptor release that is not pressed can also be employed without departing from the scope of the disclosure. Additionally, the semi-circular arms 352. 352' need not be semi-circular as illustrated.

The nose 330 has a window 370 through which a fastener strip, such as a collated fastener strip, can be fed or passed-through. The window 370 is shaped to allow smaller straps to pass through the window while still providing substantial support for the entire screw strip. The window 370 has a main window section 372 with a first side 371, a second side 373 perpendicular to the first side. A third side is opposite the first side 371 and perpendicular to the opposite end of the second side 373. A fourth side is opposite the second side 373. An angled slender window component 374 extending from a side of the main window section 372 on the fourth side near the first side 371. A shelf 376 is provided continuous with the third side of the window 370. The shelf 376 provides a shelf surface which is support for an entire screw strip when the screw is being driven.

FIGS. 4A-D illustrate the window component 370 in additional detail from a window facing view (FIG. 4A), from an angle (FIG. 4B), from a window facing view with a retaining strap 140 passing through the window (FIG. 4C); and from an angle with a retaining strap 140 passing through the window.

IV. Torque Transmitter/Clutch Bit Configurations

Figure 5A:
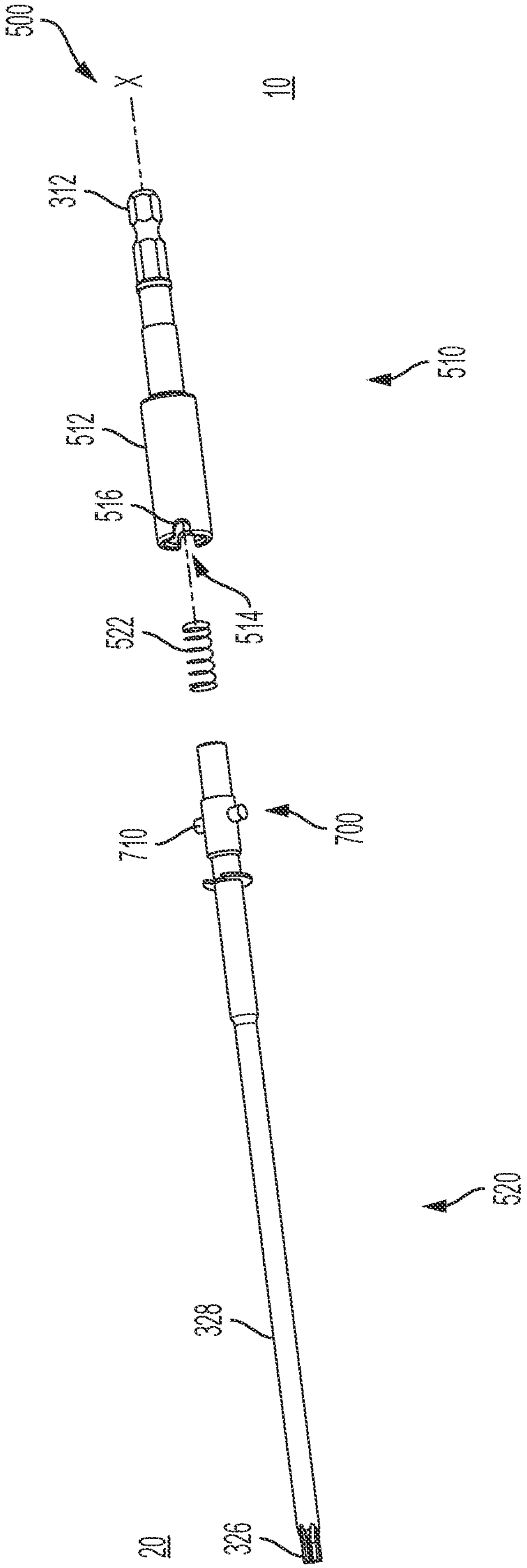
FIGS. 5A-C illustrate a clutch system suitable for use in the fastener delivery system to transmit torque from the power driver to a fastener.
Figure 5B:
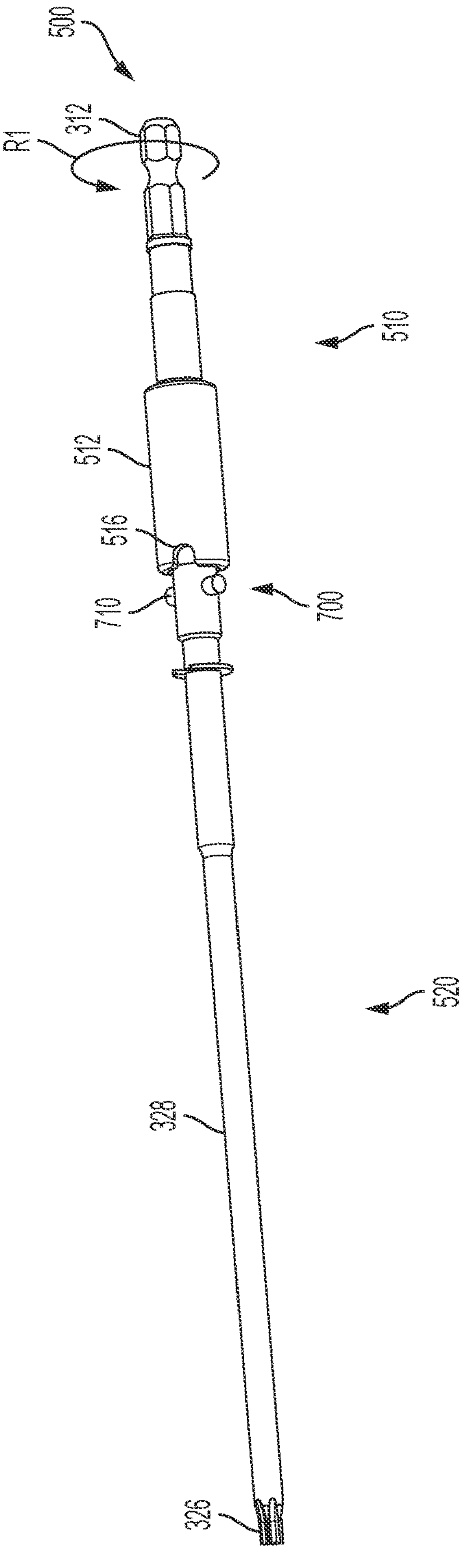
Figure 5C:
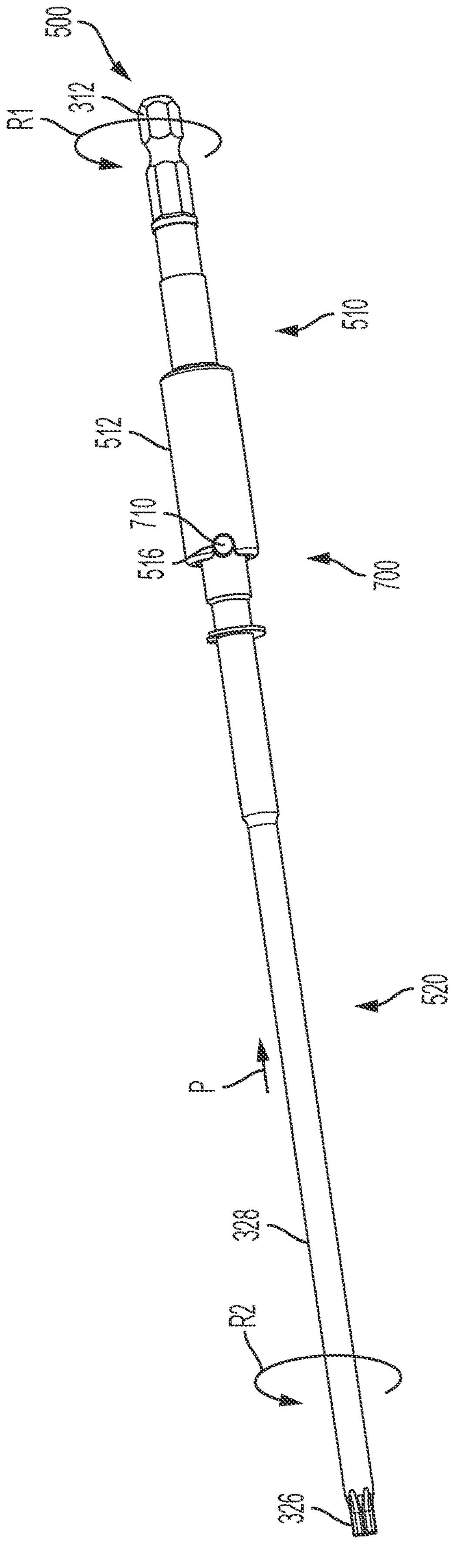

FIGS. 5A-C illustrate a clutch bit 500 configuration suitable to transmit torque from a power driver 110 to a fastener 130 for use in the fastener delivery system 100 along a longitudinal axis x. The clutch bit 500 is a torque transmitter with a first end 10 and second end 20, oriented the same as in the other figures. FIG. 5A is an exploded view of the clutch bit 500. The clutch bit 500 has a bit 326 on a distal end of a shaft 328, a coupler 512 and a coupler spring 522. The bit 326 drives the fasteners, the coupler 512 engages a motor to deliver torque from the motor to the fastener, and the coupler spring 522 is biased to keep the bit 326 and the coupler 512 disengaged. Turning to FIG. 5B, the coupler 512 does not fully engage the shaft 328, when the cross-pin 710 is not positioned within the slot 516 of the coupler 512. Thus, applying torque at the first end 10 of the clutch bit 500 results in the coupler 512 spinning R1 and the bit 326 at the second end 20 remaining essentially stationary (i.e., torque is not applied to the bit at the distal end) because the coupler spring 522 keeps the two components separated. As shown in FIG. 5C, once the cross-pin 710 located at the proximal end of the shaft 328 is positioned within slot 516 of the coupler 512, torque is transferred through the coupler 512 to the bit 326 at the distal end of the shaft causing the coupler to spin R1 about a longitudinal axis and the shaft 328 to spin R2. When driving a fastener, the bit 326 moves axially into the coupler 512. Once the fastener is fully seated, after driving, disengagement occurs via the internal coupler spring 522 positioned between the shaft 328 and the coupler 512. Disengagement prevents the bit 326 from grinding and damaging the fastener interface, e.g., recess.

Figure 6:
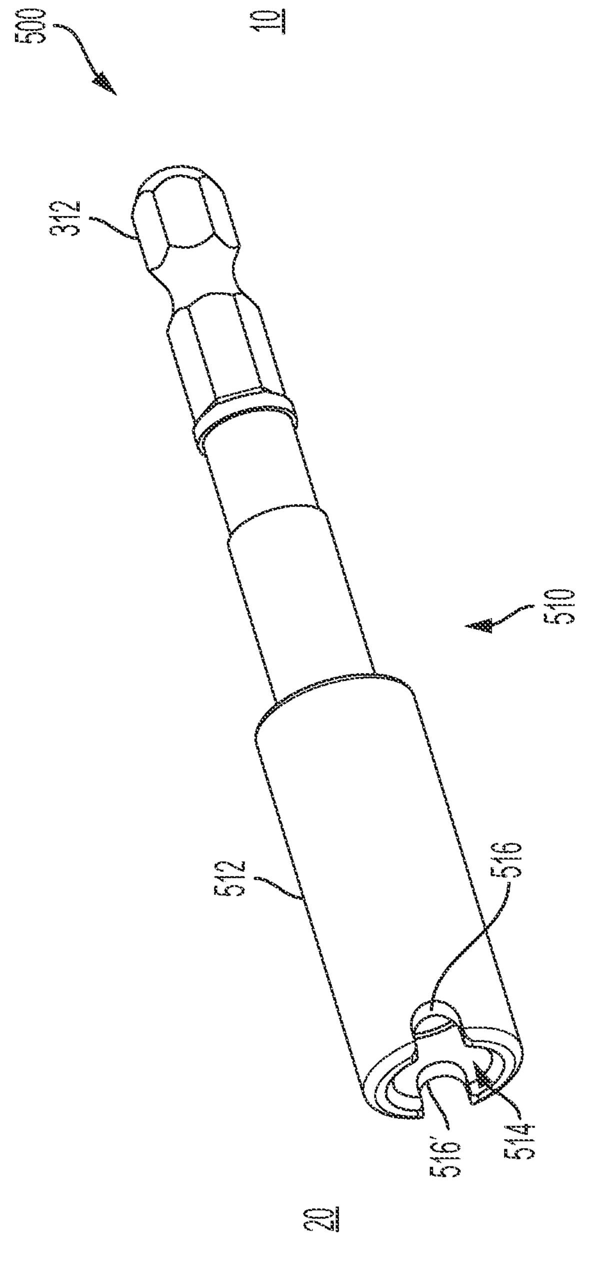
FIG. 6 illustrates a coupler.

FIG. 6 illustrates the coupler 512 shown in FIGS. 5A-C. The coupler 512 is illustrated with shank 312 at a proximal end configured to engage a drive motor. The coupler spring (not shown) is positioned inside a cavity 518 in the proximal end. The opening to the cavity 518 has a slot 516, 516' positioned bilaterally on either side of the opening. The slots 516, 516' are, as illustrated, semicircular recesses. Other slot configurations can be used without departing from the scope of the disclosure. The hex shape of the shank 312 engages a power driver 110 and transfers torque applied from the motor of the power driver 110 to the coupler 512. The slots 516, 516' of the coupler 512 then transfer torque to the shaft 328 when the slots 516, 516' are engaged by the cross-pin 710. The internal coupler spring 522 biases disengagement of the coupler 512 and the bit 326 to avoid applying too much torque to the fastener 130.

Figure 7A:
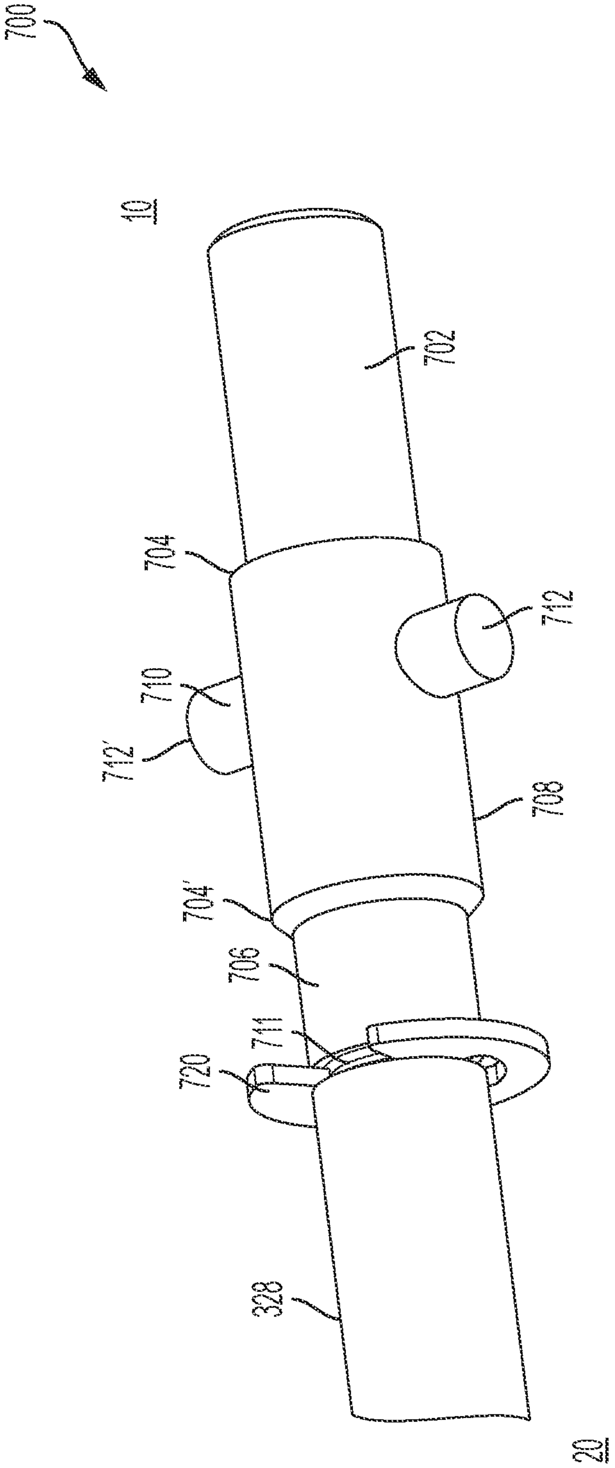
FIGS. 7A-C illustrate configurations of a bit.
Figure 7B:
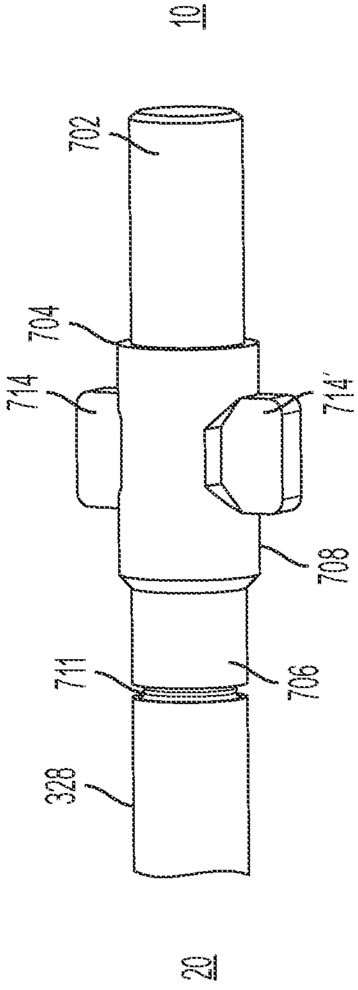
Figure 7C:
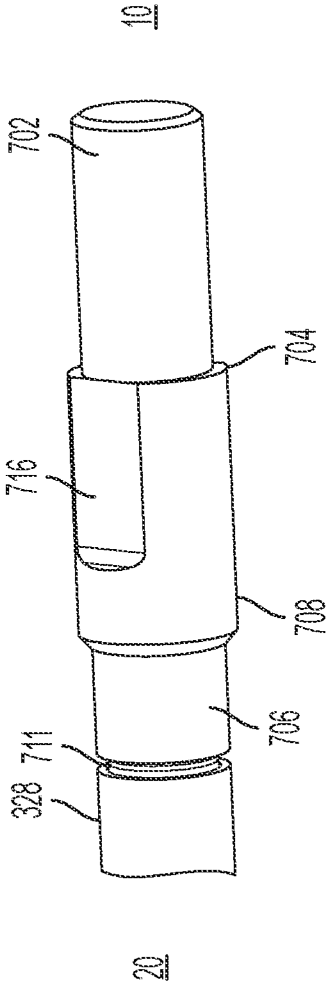

FIGS. 7A-C illustrate configurations of a first end 10 of the shaft 328 of the bit. The first end 10 of the shaft 328 has three sections. A first section is a pilot 702 with a first diameter that keeps the bit and coupler axially aligned when the pilot 702 is slidably positioned within the coupler cavity. At the second section 708, distal to the first section, the diameter of the shaft 328 increases to a second diameter to provide a first shoulder 704 for the coupler to seat against when the pilot 702 is positioned within the coupler cavity. The first shoulder 704 prevents a lateral load from being applied when the cross-pin 710 engages the coupler. A cross-pin 710 passes through the distal end of the bit distal to the first shoulder 704 along a portion of the second diameter. As illustrated, the cross-pin 710 has a circular profile in one dimension and a first cross-pin end 712, and a second cross-pin end 712'. A third section 706, positioned distal to the second section 708, decreases in diameter to a third diameter, with a second shoulder 704' between the two sections. The third diameter can be the same or substantially the same as the first diameter of the pilot 702. Positioned in the third section, distal to the cross-pin 710 is an e-clip 720. The e-clip 720, or circlip, is a C-shaped retaining ring that snaps into place. A groove 711 is provided in the exterior surface of the shaft into which the e-clip 720 snaps into place when positioned. The e-clip 720 keeps the bit restrained in the auto feed attachment (not shown) during use.

FIGS. 7B-C illustrate other design options for the proximal end of the shaft 328. For example, instead of the cross-pin 712 illustrated in FIG. 7A, a stamped tab 714 can pass through an aperture in the shaft 328. As will be appreciated by those skilled in the art, the cross-pin 712 and/or stamped tab 714 can be a single piece that passes through an aperture, or can be formed integrally formed with the shaft and extend from the surface.

Alternatively, as shown in FIG. 7C, a milled flat 716 can be used to engage the coupler. Additionally, the milled flats 716, or other geometric shapes can be provided to transfer torque. Where a milled flat or other geometric shape is used, the coupler would provide a similar internal mating geometry to engage the milled flat 716 or other geometric shape.

Figure 8A:
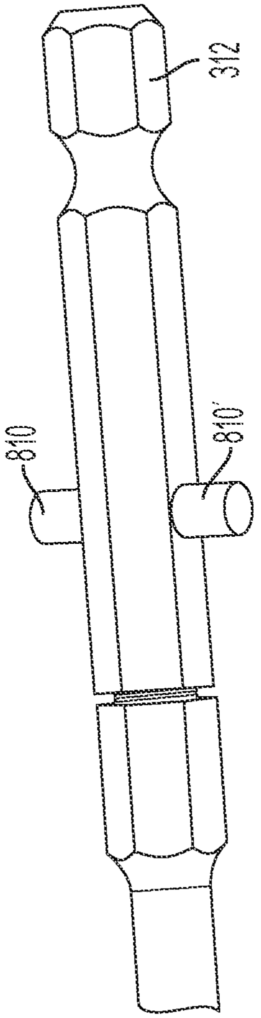
FIGS. 8A-B illustrate a hex drive.
Figure 8B:
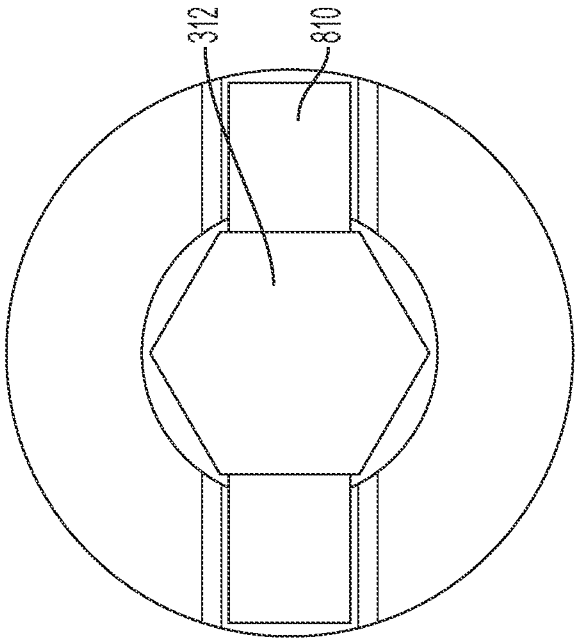

FIGS. 8A-B illustrate an alternative embodiment of the shank 312. The shank 312 is a hex drive and includes an cross-pin 810. As shown in the cross-section of FIG. 8B, in use, the inner diameter of the coupler 512 is larger than the hex of the shank 312. The cross-pin 810 is positioned far enough away from the end of the shank 312, that the cross-pin 810 will not interfere with insertion of the shank 312. To work as a clutch bit, the inner diameter of the coupler is larger than the hex corners so that torque is only transferred by the cross-pin 810.

Figure 9:
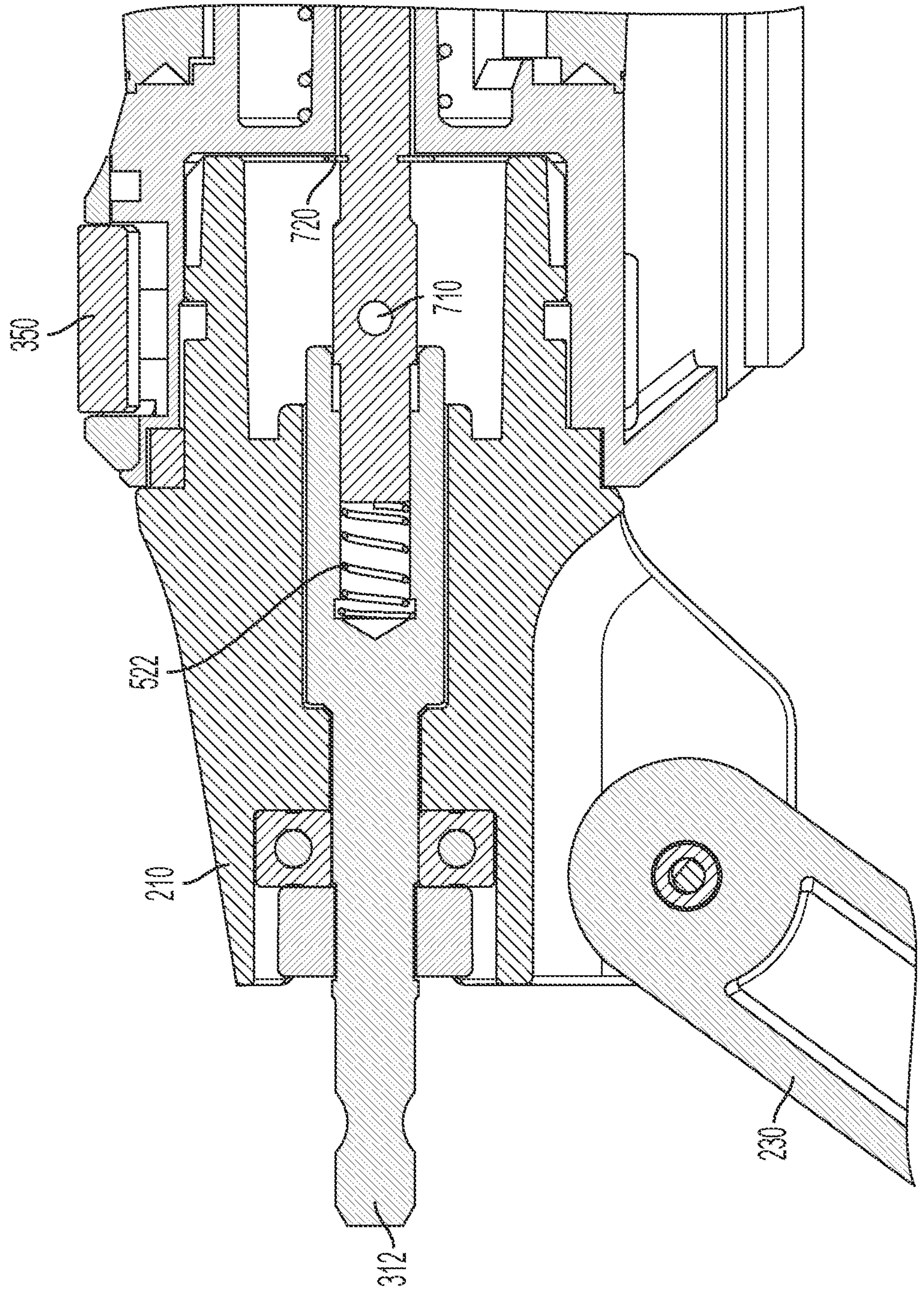
FIG. 9 illustrates a portion of the fastener delivery system with the proximal end of the clutch system positioned within the adapter body.

FIG. 9 illustrates a portion of the fastener delivery system with the proximal end of a clutch system positioned within the ramp receiving aperture 362. The pilot 702 keeps the bit 326 and the coupler axially aligned. The e-clip 720 engages an interior surface of the fastener delivery system to restrain forward motion of the bit 326.

V. Methods of Use/Operation

A method for installing fasteners using the disclosed devices comprises: providing a power driver 110 having a power source (not shown); connecting an adapter 200 comprising a first end operable to engage the power driver 110 and a second end having a spline 220 with teeth 222 to the power driver 110; connecting a fastener delivery attachment 300 having an adapter release button 350 on an exterior surface, a slide body 310 coupled to an attachment body 320 for reciprocal displacement in a retraction stroke wherein the fastener delivery attachment 300 is configured to deliver one or more fasteners 130 to the adapter 200; and feeding one or more fasteners 130 or a fastener strip 120 through a window 370 of the fastener delivery attachment 300. Another method for installing fasteners comprises: providing a power driver 110 having a power source (not shown); connecting an adapter 200 comprising a first end operable to engage the power driver 110 and a second end having a spline 220 with teeth 222 to the power driver 110; connecting a fastener delivery attachment 300 having a slide body 310 coupled to an attachment body 320 for reciprocal displacement in a retraction stroke wherein the fastener delivery attachment 300 is operable to deliver one or more fasteners 130, and a fastener pass-through window 370 having an elongated channel aperture 332 in communication with a side of the pass-through window 370; and feeding one or more fasteners 130 or a fastener strip through a window 370 of the fastener delivery attachment 300. The methods for installing fasteners can also comprise: providing a power driver 110 having a power source (not shown); connecting an adapter 200 comprising a first end operable to engage the power driver 110 and a second end, and a handle 230; connecting a fastener delivery attachment 300 having a slide body 310 coupled to an attachment body 320 for reciprocal displacement in a retraction stroke wherein the fastener delivery attachment 300 is operable to deliver one or more fasteners 130 to the adapter 200; and feeding the one or more fasteners 130 through a delivery window 370 of the fastener delivery attachment 300. Other methods for installing fasteners 130 can include: providing a power driver 110 having a power source (not shown); connecting an adapter 200 comprising a first end operable to engage the power driver 110 and a second end, and a strap 240; connecting a fastener delivery attachment 300 having a slide body 310 coupled to an attachment body 320 for reciprocal displacement in a retraction stroke wherein the fastener delivery attachment 300 is operable to deliver one or more fasteners 130 to the adapter 200; and feeding the one or more fasteners 130 through a delivery window 370 of the fastener delivery attachment 300.

Methods can also include the step of applying a torque from the power driver 110 to the fastener delivery attachment 300 and serially installing a plurality of fasteners from the fastener strip 120 at locations on a target surface and/or serially installing a plurality of fasteners 130 from the fastener strip 140 at locations on a target surface. During use, the adapter 200 is connected to the power driver 110 by inserting the shank 212 into the chuck 116 of the power driver 110. The jaws within the chuck 116 are closed around the shank 212 to securely engage the adapter 200 to the power driver. The strap 240 is secured around a portion of the power driver 110, such as around the handle 114 as shown in FIG. 1A. The driving attachment 300 is attached to the adapter 200 by pushing the driving attachment 300 onto the spline 220 interface of the adapter 200 in a rear direction.

In operation, a fastener strip 120 containing a number of fasteners 130 collated in the plastic retaining strap 140 is inserted into a the feed channel 332 with a first fastener to be driven received within a feed channel 332 to drive the first fastener into a target surface or work area. Once the fastener 130 is positioned within the central aperture in engagement with the bit 326 of the shaft 328, the fastener is ready for installation. Activation of the power driver 110 rotates the shank 212 of the adapter 200 which then causes the shaft 328 of the driving attachment 300 to rotate. The drive shaft 328 has a fixed length and rotates relative to the feed channel 332, the drill, and the adapter.

In a driving stroke, manual pressure of the user pushes the entire assembly towards the target surface (movement m). With initial manual pressure, the forward end of the nose 310 engages the target surface to move the nose 310 from a forward position to a rear position. The nose 310 moves rearwardly until either a fastener 130 becomes sandwiched between the nose 310 and a fastener interface within the fastener driving attachment or the nose 310 moves m to a rear position relative to the feed channel 332. On release of this manual pressure, in a return stroke, the nose 310 moves to a forward position thereby moving the housing and the shaft 328 away from the target surface. Once a fastener is delivered, another fastener is auto-fed into the feed channel 332.

VI. Kits

Kits can comprise one or more of the following: an adapter 200, a driving attachment 300, and one or more fasteners 130 and/or fasteners strips 120. A fastener installation 100 kit can, for example, comprise: a fastener delivery attachment 300 having an adapter release button 350 on an exterior surface, a slide body 310 coupled to an attachment body 320 for reciprocal displacement in a retraction stroke wherein the fastener delivery attachment 300 is configured to deliver one or more fasteners 130; an adapter 200 comprising a first end operable to engage the power driver 110 and a second end having a spline 220 with teeth 222 operable to engage the fastener delivery attachment 300; and a torque transmitter 500 operable to transmit torque from the power to the one or more fasteners 130.

Another installation system 100 kit can comprise: a fastener delivery attachment 300 having a slide body 310 coupled to an attachment body 320 for reciprocal displacement in a retraction stroke wherein the fastener delivery attachment 300 is configured to deliver one or more fasteners 130; an adapter 200 comprising a first end operable to engage the power driver 110, a second end having a spline 220 with teeth 222 operable to engage the fastener delivery attachment 300, and a handle 230 extending from an adapter body 210; and a torque transmitter 500 operable to transmit torque from the power driver 110 to the one or more fasteners 130.

Yet another fastener installation system 100 kit can comprise: a fastener delivery attachment 300 having a slide body 310 coupled to an attachment body 320 for reciprocal displacement in a retraction stroke wherein the fastener delivery attachment 300 is operable to deliver one or more fasteners 130; an adapter 200 comprising a first end operable to engage the power driver 110, a second end operable to engage the fastener delivery attachment 300, and a strap 240; and a torque transmitter 500 operable to transmit torque from the power driver 110 to the one or more fasteners 130.

Kits can also include a power driver 110, one or more fasteners 130, and/or one or more fastener strips 120.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the claims define the scope of the invention and that methods and structures within the scope of these claims and their equivalents be covered thereby.

What is claimed:

1. A fastener installation system comprising:

a power driver having a power source;

a fastener delivery attachment having an adapter release button on an exterior surface, a slide body coupled to an attachment body for reciprocal displacement in a retraction stroke wherein the fastener delivery attachment is configured to deliver one or more fasteners;

an adapter comprising a first end operable to engage the power driver and a second end having a spline with teeth operable to engage the fastener delivery attachment; and a torque transmitter operable to transmit torque from the power driver to the one or more fasteners.

2. The fastener installation system of claim 1 wherein the fastener delivery attachment further comprises a fastener pass-through window.

3. The fastener installation system of claim 2 wherein the fastener pass-through window has a shelf surface configured to support a fastener.

4. The fastener installation system of claim 2 wherein an elongated channel aperture is in communication with the pass-through window.

5. The fastener installation system of claim 1 wherein the adapter further comprises a handle.

6. The fastener installation system of claim 5 wherein the handle is operable to extend away from an adapter body.

7. The fastener installation system of claim 6 wherein the handle is operable to rotate in a forward and rearward direction.

8. The fastener installation system of claim 1 wherein the adapter further comprises a strap operable to engage the power driver.

9. The fastener installation system of claim 1 further comprising a fastener strip.

10. The fastener installation system of claim 1 wherein the torque transmitter further comprises a shaft, a coupler spring and a coupler.

11. The fastener installation system of claim 10 wherein the torque transmitter further comprises one or more of a cross-pin, a tab, an e-clip, a shoulder, a milled flat and a coupler slot.

* * * * *